(12) United States Patent
Honjo

(10) Patent No.: US 12,143,714 B2
(45) Date of Patent: Nov. 12, 2024

(54) IMAGE CAPTURING CONTROL APPARATUS, IMAGE CAPTURING SYSTEM, IMAGE CAPTURING CONTROL METHOD, AND NON-TRANSITORY COMPUTER-READABLE STORAGE MEDIUM

(71) Applicant: CANON KABUSHIKI KAISHA, Tokyo (JP)

(72) Inventor: Tomoya Honjo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/504,379

(22) Filed: Nov. 8, 2023

(65) Prior Publication Data
US 2024/0073521 A1 Feb. 29, 2024

Related U.S. Application Data

(63) Continuation of application No. 17/687,868, filed on Mar. 7, 2022, now Pat. No. 11,843,856.

(30) Foreign Application Priority Data

Mar. 11, 2021 (JP) ................. 2021-039533

(51) Int. Cl.
*H04N 23/663* (2023.01)
*H04N 23/80* (2023.01)
*H04N 23/90* (2023.01)

(52) U.S. Cl.
CPC ........... *H04N 23/663* (2023.01); *H04N 23/80* (2023.01); *H04N 23/90* (2023.01)

(58) Field of Classification Search
CPC ...... H04N 23/663; H04N 23/80; H04N 23/90; H04N 17/002; G06F 11/0733; G06F 11/0751; G06F 11/22
See application file for complete search history.

(56) References Cited

U.S. PATENT DOCUMENTS

| 6,681,390 B2 | 1/2004 | Fiske | |
| 2016/0117831 A1* | 4/2016 | Nakashima | G06T 7/001 382/154 |
| 2016/0344945 A1* | 11/2016 | Kano | G06T 5/50 |
| 2018/0205598 A1* | 7/2018 | Kawabata | H04L 49/254 |
| 2019/0260983 A1 | 8/2019 | Ito | |
| 2019/0324761 A1* | 10/2019 | Choi | G06F 9/4405 |

FOREIGN PATENT DOCUMENTS

JP 10-55319 A 2/1998

* cited by examiner

*Primary Examiner* — Mekonnen D Dagnew
(74) *Attorney, Agent, or Firm* — Cowan, Liebowitz & Latman, P.C.

(57) ABSTRACT

There is provided with an image capturing control apparatus. A first storing unit configured to store, in advance, first signal information that is obtained by processing a captured first image. A first processing unit configured to send the first image to a second storing unit that is different from the first storing unit. A second processing unit configured to process the first image stored in the second storing unit. A determination unit configured to determine whether or not at least one of the second processing unit and the second storing unit is anomalous based on whether the first signal information matches second signal information obtained by the second processing unit processing the first image.

13 Claims, 24 Drawing Sheets

FIG. 14

| 1401 | | | | | | | |
|---|---|---|---|---|---|---|---|
| PROCESSING FUNCTION RETAINING FLAG | | | | | | | |
| 0133 | 4567 | 89AB | CDEF | 0133 | 4567 | 89AB | CDEF |
| 0001 | 4040 | 0014 | 0640 | 0010 | FFFF | FFFF | 0000 |
| 0002 | 2020 | 001E | 2000 | 0020 | EEEE | EEEE | 0000 |
| 0003 | 1010 | 0028 | 0641 | 0030 | AAAA | AAAA | 0000 |
| 0004 | 0808 | 0050 | 0042 | 0040 | BBBB | BBBB | 0000 |
| ... | ... | ... | ... | ... | ... | ... | ... |
| ... | ... | ... | ... | ... | ... | ... | ... |
| 1402 | 1403 | 1404 | 1405 | 1406 | 1407 | | |

FIG. 15

| 1402 | 1403 | 1404 | 1405 | 1406 | 1407 |
|---|---|---|---|---|---|
| PROCESS TYPE | INPUT SIZE | INPUT DATA NUMBER | ESTIMATED PROCESSING TIME | PROCESSING RESULT DATA NUMBER | ANALYSIS RESULT STORAGE ADDRESS |
| ANALYZING PROCESS A | 64×64 | 20 BLOCKS | 100ns | 16 BLOCKS | 0xFFFFFFFF |
| ANALYZING PROCESS B | 32×32 | 30 BLOCKS | 512ns | 32 BLOCKS | 0xEEEEEEEE |
| ANALYZING PROCESS C | 16×16 | 40 BLOCKS | 100μs | 48 BLOCKS | 0xAAAAAAAA |
| ANALYZING PROCESS D | 8×8 | 80 BLOCKS | 4ms | 64 BLOCKS | 0xBBBBBBBB |
| ... | ... | ... | ... | ... | ... |

IMAGE CAPTURING CONTROL APPARATUS, IMAGE CAPTURING SYSTEM, IMAGE CAPTURING CONTROL METHOD, AND NON-TRANSITORY COMPUTER-READABLE STORAGE MEDIUM

CROSS-REFERENCE TO RELATED APPLICATION

This application is a continuation of application Ser. No. 17/687,868, filed Mar. 7, 2022, the entire disclosure of which is hereby incorporated by reference.

BACKGROUND OF THE INVENTION

Field of the Invention

The present invention relates to an image capturing control apparatus, an image capturing system, an image capturing control method, and a non-transitory computer-readable storage medium.

Description of the Related Art

In recent years, an image analysis for detection, tracking, estimation, or the like of an object using an image captured by a monitoring camera is performed in various scenes. Also, image processing such as estimation of the number of objects is performed based on an image analysis result. Heretofore, high-performance computation apparatuses such as a PC and a server perform image processing on a video or the like from a monitoring camera. On the other hand, as a result of improvement in processing ability of mobile computation apparatuses in recent years, monitoring cameras can now perform image processing on a video and the like. The image processing by a monitoring camera is executed by a computation apparatus mounted on a camera body, for example. Also, auxiliary processing apparatuses such as USB can incorporate a computation apparatus. A monitoring camera can mount the aforementioned auxiliary processing apparatus on its camera, and a portion of the image processing performed by a computation apparatus of the monitoring camera can be executed by a computation apparatus of the auxiliary processing apparatus. However, if the auxiliary processing apparatus malfunctions, because the method of dealing with the malfunction differs depending on the cause of the malfunction, diagnosis needs to be performed in order to specify the cause of the malfunction. On the other hand, the scale of circuit that can be realized in an FPGA (Field Programmable Gate Array) included in an auxiliary processing apparatus is limited. As a method of performing inspection of an internal memory of a microprocessor circuit and specifying the cause of malfunction, a technique in which an inspection program and a memory space for replacement of the internal memory are provided in a detachable memory card is described in Japanese Patent Laid-Open No. 10-55319.

SUMMARY OF THE INVENTION

The present invention in its one aspect provides an image capturing control apparatus comprising a first storing unit configured to store, in advance, first signal information that is obtained by processing a captured first image, a first processing unit configured to send the first image to a second storing unit that is different from the first storing unit, a second processing unit configured to process the first image stored in the second storing unit, and a determination unit configured to determine whether or not at least one of the second processing unit and the second storing unit is anomalous based on whether the first signal information matches second signal information obtained by the second processing unit processing the first image.

The present invention in its one aspect provides an image capturing control method comprising storing, in advance, first signal information regarding a captured first image, sending the first image, processing the first image, and determining whether or not an image capturing control apparatus is anomalous, based on whether or not the first signal information matches second signal information obtained by processing the first image.

The present invention in its one aspect provides an non-transitory computer-readable storage medium storing a program that, when executed by a computer, causes the computer to perform a method of an image capturing apparatus comprising storing, in advance, first signal information regarding a captured first image, sending the first image, processing the first image, and determining whether or not an image capturing control apparatus is anomalous, based on whether or not the first signal information matches second signal information obtained by processing the first image.

Further features of the present invention will become apparent from the following description of exemplary embodiments (with reference to the attached drawings).

BRIEF DESCRIPTION OF THE DRAWINGS

FIG. 14 is a diagram illustrating data at addresses at which information regarding a processing function according to the present embodiment is stored.

FIG. 15 is a diagram illustrating an example of information to be acquired by the image capturing apparatus according to the present embodiment.

DESCRIPTION OF THE EMBODIMENTS

Figure 1:
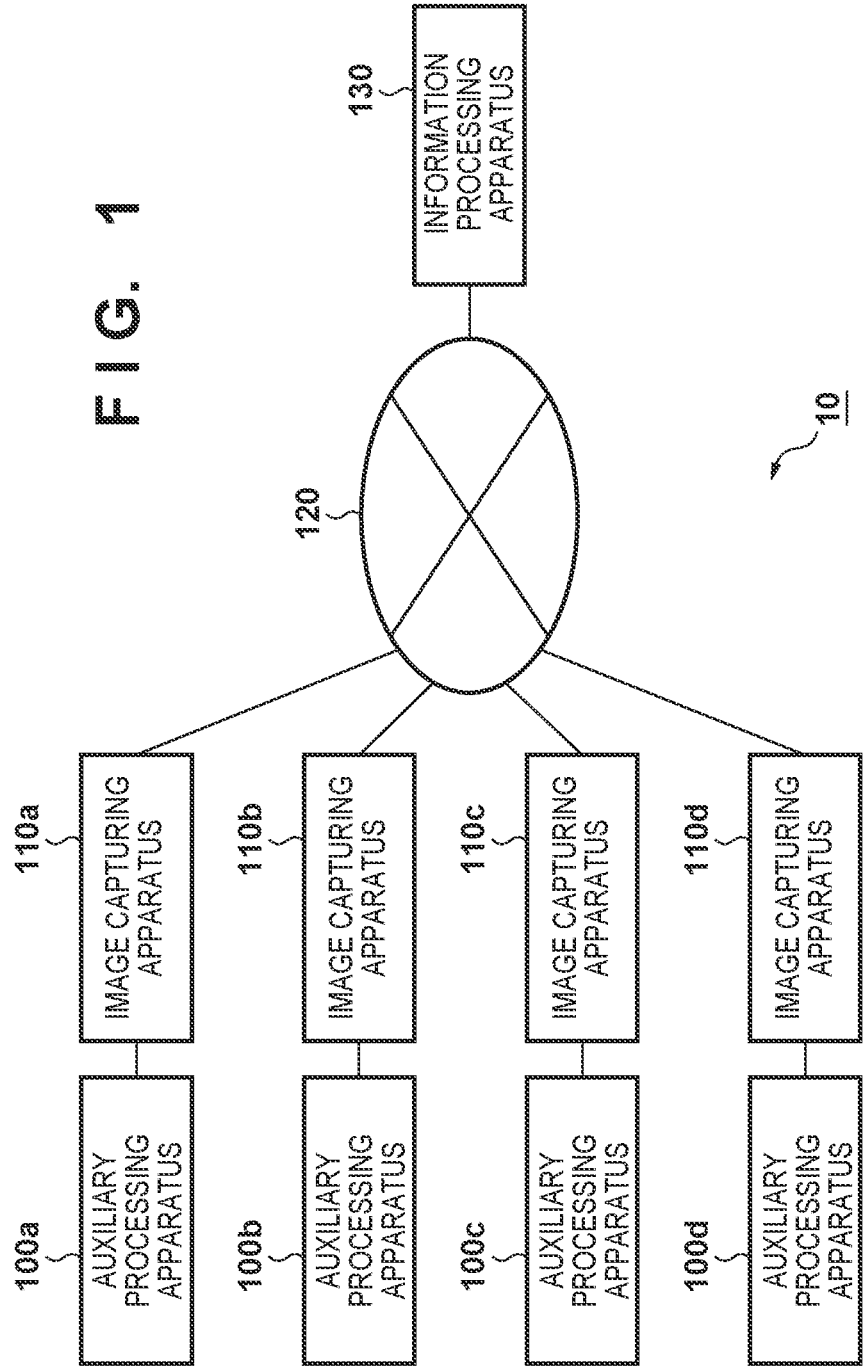
FIG. 1 is a configuration diagram of an image capturing system according to a present embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

According to the present invention, malfunction of an auxiliary processing apparatus mounted in an image capturing apparatus can be easily specified.

First Embodiment

In the following, an image capturing system 10 according to the present embodiment will be described.

FIG. 1 illustrates an example of a configuration of the image capturing system 10 of the present embodiment. A case where the image capturing system 10 is a specific person tracking system will be described. Note that the image capturing system 10 is not limited to the specific person tracking system, and may be applied to any system in which predetermined information is output by analyzing an image. The image capturing system 10 includes an image capturing apparatus 110a, an image capturing apparatus 110b, an image capturing apparatus 110c, an image capturing apparatus 110d, a network 120, and an information processing apparatus 130. Also, the image capturing system 10 includes an auxiliary processing apparatus 100a, an auxiliary processing apparatus 100b, an auxiliary processing apparatus 100c, and an auxiliary processing apparatus 100d. Note that the image capturing apparatuses 110a to 110d each includes a slot through which a device (e.g., SD card) that can record captured images, for example, can be attached and detached. As a result of the auxiliary processing apparatuses 100a to 100d being inserted to the respective slots of the image capturing apparatuses 110a to 110d, the auxiliary processing apparatuses 100a to 100d are respectively connected to the image capturing apparatuses 110a to 110d. In the following, description will be given using the auxiliary processing apparatus 100a as the representative of the auxiliary processing apparatuses, and the image capturing apparatus 110a as the representative of the image capturing apparatuses.

The auxiliary processing apparatus 100a is a computation device that can be attached to and detached from the image capturing apparatus 110a. The auxiliary processing apparatus 100a is a device in which a predetermined processing circuit is mounted in an SD card, for example. The auxiliary processing apparatus 100a is configured such that the entirety of an SD card can be inserted in the image capturing apparatus 110a according to the shape of the SD card. Accordingly, the auxiliary processing apparatus 100a is connected to the image capturing apparatus 110 in a state in which no portion thereof protrudes from the image capturing apparatus 110a. The auxiliary processing apparatus 100a does not interfere with obstacles around the image capturing apparatus 110a such as wiring, and therefore the convenience of arranging the image capturing apparatus 110a is improved. Also, the image capturing apparatus 110a including a normal network camera or the like is equipped with an SD card slot, and therefore, the auxiliary processing apparatus 100a can provide an expanded function to the image capturing apparatus 110a. Note that the auxiliary processing apparatus 100a may also be a storage apparatus that can store images captured by the image capturing apparatus 110a, in addition to a mode of an SD card. For example, the auxiliary processing apparatus 100a may include a USB interface and be configured to be attached to a USB socket of the image capturing apparatus 110a. Also, the predetermined processing circuit is an FPGA that is programed to execute a predetermined process, for example, but may be implemented by another device.

The image capturing apparatus 110a is an image capturing apparatus such as a network camera, for example. In the present embodiment, the image capturing apparatus 110a incorporates a computation apparatus that can perform an imaging process or the like, but is not limited thereto. For example, an information processing apparatus (unshown) such as a PC connected to the image capturing apparatus 110a may be present, and this combination may be denoted as the image capturing apparatus 110a. Also, in the present embodiment, auxiliary processing apparatuses are respectively attached to all image capturing apparatuses. In FIG. 1, four auxiliary processing apparatuses that are respectively attached to four image capturing apparatuses are shown, but the number of combinations of the image capturing apparatus and the auxiliary processing apparatus may be three or less, or five or more, for example. By attaching the auxiliary processing apparatus 100a having an image analyzing processing function to the image capturing apparatus 110a, the image capturing apparatus 110a can perform an imaging process, even if the image capturing apparatus 110a does not have an image analyzing processing function. Also, when a computation apparatus for an imaging process is incorporated in the image capturing apparatus 110a, as in the present embodiment, as a result of the auxiliary processing apparatus 100a that incorporates a computation apparatus being attached to the image capturing apparatus 110a, the image capturing apparatus 110a can execute various types of and high performance imaging processes.

The information processing apparatus 130 is an apparatus that receives inputs from a user and outputs information (e.g., image display) to a user. In the present embodiment, the information processing apparatus 130 is a computer such as a PC, and information is input and output through a browser or a native application installed in the computer. Note that the information processing apparatus 130 may also be a mobile information terminal in which a display unit and an input unit are integrated, such as a smartphone, a tablet, or a PDA.

All of the image capturing apparatuses and the information processing apparatuses 130 are connected such that mutual communication is possible via the network 120. The network 120 includes a plurality of routers, switches, cables, and the like that conform to a communication standard such as Ethernet (registered trademark). In the present embodiment, the network 120 may be any network that enables communication between all of the image capturing apparatuses and information processing apparatuses 130, and may be configured to be conformable to any communication standard, in any scale. For example, the network 120 may be the Internet, a wired LAN, a wireless LAN, or a WAN. Also, the network 120 may be configured to enable communication through a communication protocol conforming to ONVIF (Open Network Video Interface Forum) standard, for example. Note that there is no limitation thereto, and the network 120 may be configured to enable communication through an original communication protocol or another communication protocol, for example.

Figure 2:
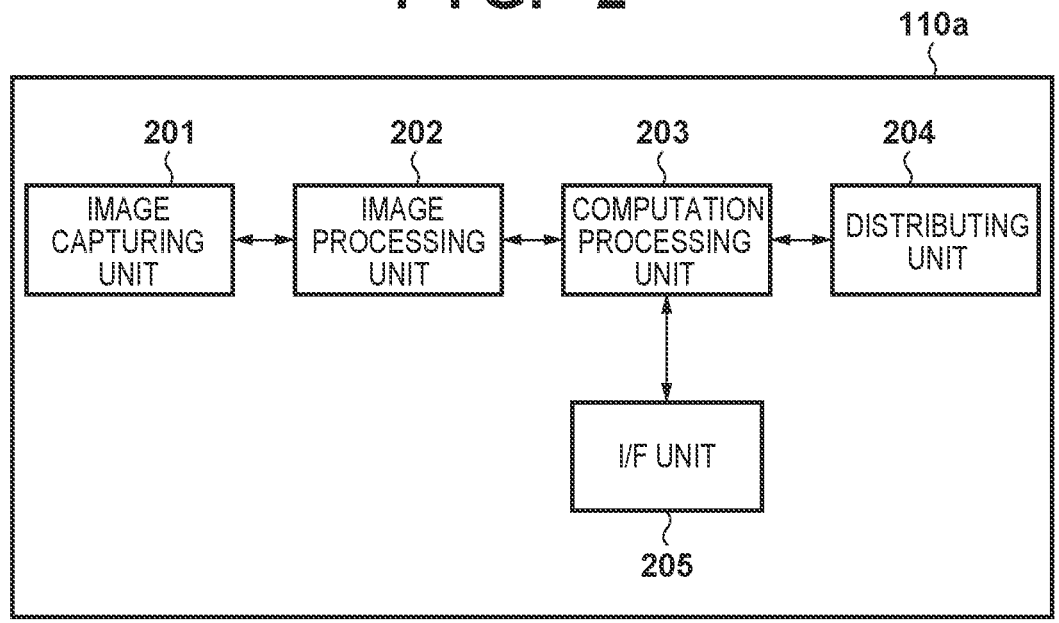
FIG. 2 is a configuration diagram of the image capturing system according to the present embodiment.

FIG. 2 is a diagram illustrating an exemplary configuration of the image capturing apparatus 110a. The image capturing apparatus 110a includes an image capturing unit 201, an image processing unit 202, a computation processing unit 203, a distributing unit 204, and an I/F unit 205. Note that the image capturing apparatuses 110b to 110c includes constituent elements similar to those of the image capturing apparatus 110a. The image capturing unit 201 includes a lens for forming an optical image and an image sensor for converting the optical image formed by the lens to an analog signal. The lens includes a zoom function for adjusting the angle of view, a diaphragm function for adjusting the light amount, and the like. The image sensor includes a gain function of adjusting sensitivity of conversion from light to an analog signal. These functions are adjusted based on setting values notified from the image processing unit 202. The analog signal obtained by the image capturing unit 201 is converted to a digital signal by an analog to digital conversion circuit, and the digital signal is transferred to the image processing unit 202 as an image signal.

The image processing unit 202 includes an image processing engine and a peripheral device thereof. The peripheral device includes a RAM and drivers of the I/Fs. The image processing unit 202 generates image data by performing an imaging process such as a developing process, filtering process, sensor correction, and noise removal on the image signal obtained by the image capturing unit 201. Also, the image processing unit 202 executes exposure adjustment by sending setting values to the lens and the image sensor in order to obtain an appropriate exposure image. The image data generated in the image processing unit 202 is transferred to the computation processing unit 203.

The computation processing unit 203 includes one or more processors such as a CPU and MPU (Micro Processing Unit), memories such as a RAM and a ROM, and drivers of the I/Fs. The computation processing unit 203 determines the assignment of processes to be performed by the image capturing apparatus 110a and the auxiliary processing apparatus 100a, with respect to processes to be executed by the image capturing system 10. The computation processing unit 203 performs processes based on the determination of assignment. The processing details and the details of assignment of processes will be described later. The image data sent by the image processing unit 202 is transferred to the distributing unit 204 or the I/F unit 205. Also, the processing result data of the computation processing unit 203 is transferred to the distributing unit 204.

The distributing unit 204 includes a network distribution engine and peripheral devices such as a RAM and an ETH PHY module. The ETH PHY module is a module that executes processes in a physical (PHY) layer of Ethernet. The distributing unit 204 converts the image data and the processing result data that are acquired from the computation processing unit 203 to a format distributable to the network 120, and outputs the converted data to the network 120. The I/F unit 205 is an interface portion for connecting to the auxiliary processing apparatus 100a. The I/F unit 205 includes a power supply and an attachment mechanism such as a socket for attaching and removing the auxiliary processing apparatus 100a, for example. Note that the I/F unit 205 may be configured following the SD standard defined by the SD association. The I/F unit 205 can transfer the image data obtained in the computation processing unit 203 to the auxiliary processing apparatus 100a, and can perform data transfer from the auxiliary processing apparatus 100 to the image capturing apparatus 110a. That is, the communication between the auxiliary processing apparatus 100a and the image capturing apparatus 110a is performed via the I/F unit 205.

Figure 3:
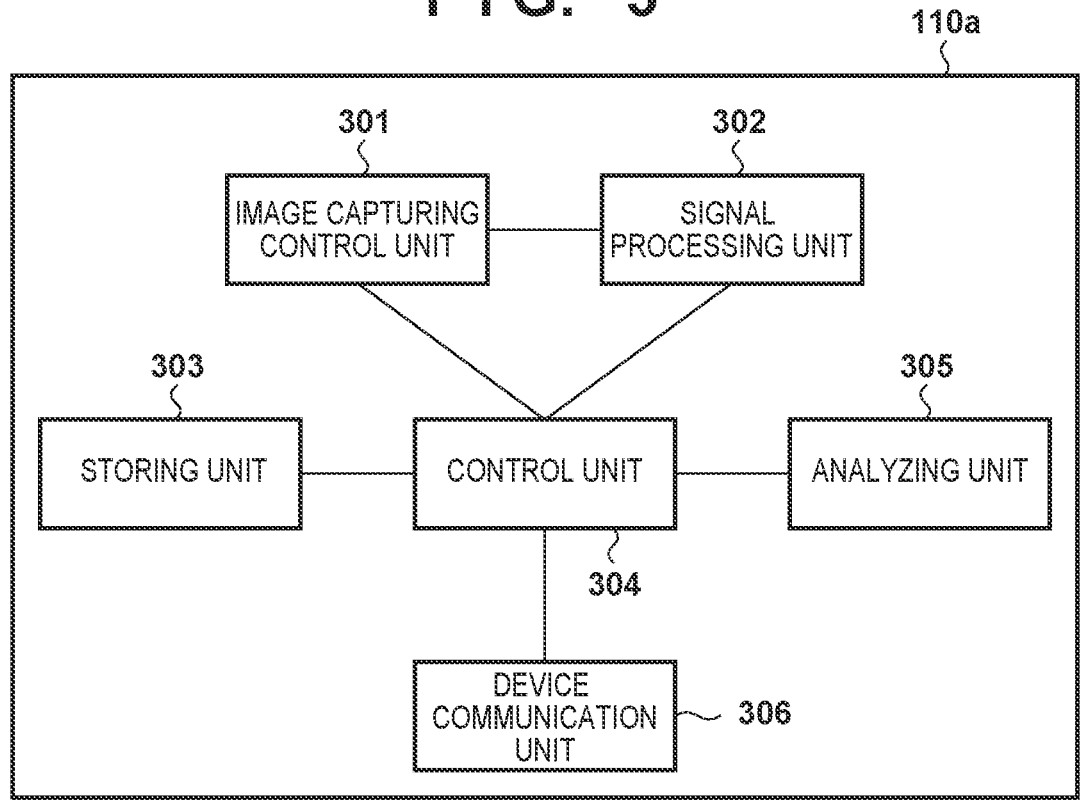
FIG. 3 is a block diagram illustrating functions of the image capturing apparatus.

FIG. 3 is a block diagram illustrating the functions of the image capturing apparatus 110a. The image capturing apparatus 110a includes an image capturing control unit 301, a signal processing unit 302, a storing unit 303, a control unit 304, an analyzing unit 305, and a communication unit 306. Note that the image capturing apparatuses 110b to 110c each include constituent elements similar to those of the image capturing apparatus 110a.

The image capturing control unit 301 executes control of shooting a surrounding environment of the image capturing apparatus 110a via the image capturing unit 201. The signal processing unit 302 generates data of a shot image by performing a predetermined process on an image shot by the image capturing control unit 301. The signal processing unit 302 encodes the image shot by the image capturing control unit 301, for example. The signal processing unit 302 encodes a still image using an encoding system such as JPEG. Also, the signal processing unit 302 encodes a moving image using an encoding system such as H.264/MPEG-4 AVC (hereinafter, H.264) or HEVC (High Efficiency Video Coding). Also, the signal processing unit 302 may encodes an image using an encoding system selected by a user from a plurality of encoding systems through an operation unit (unshown) of the image capturing apparatus 110a, for example.

The storing unit 303 stores a list of analyzing processes that can be executed in the analyzing unit 305 (hereinafter, first process list) and a list of postprocessing to be performed on an analyzing process result. Also, the storing unit 303 stores a later-described analyzing process result. Note that, in the present embodiment, an arbitrary process may also be executed in addition to the analyzing process. The storing unit 303 stores a first process list and a postprocessing list regarding processes related to the arbitrary process. The control unit 304 performs overall control of the image capturing apparatus 110a, and controls the signal processing unit 302, the storing unit 303, the analyzing unit 305, and the communication unit 306.

The analyzing unit 305 executes analysis on a shot image by selecting at least one of processing before analysis, an analyzing process, and processing after analysis, which will be described later. The processing before analysis is a process executed on a shot image before executing the analyzing process on the shot image. The processing before analysis is a process of generating divided images obtained by dividing a shot image. The analyzing process is a process for outputting information obtained by analyzing the input divided images. In the analyzing process, divided images obtained by the processing before analysis are received as inputs, and at least one of a human body detection process, a face detection process, and a vehicle detection process is executed. In the analyzing process, a result of the analyzing process regarding the aforementioned detection process is output.

The analyzing process may be processing of outputting the position of an object in the divided images using a machine learning model that has been trained to detect an object included in an image, such as that in Patent Document 1, for example. The processing after analysis is processing to be executed after executing the analyzing process. The processing after analysis is processing of outputting, as the processing result, a total number of objects detected in the divided images, based on analyzing process results on the respective divided images. Note that, in the analyzing process, an object in an image may be detected by performing pattern matching based on learning data, and the position at which the object is detected may be output.

The communication unit 306 communicates with the auxiliary processing apparatus 100a. The communication unit 306 converts input image data to a format that can be processed by the auxiliary processing apparatus 100a, and sends image data obtained by the conversion to the auxiliary processing apparatus 100a. Also, the communication unit 306 receives data from the auxiliary processing apparatus 100a, and converts the received data to a format that can be processed by the image capturing apparatus 110a. In the present embodiment, the communication unit 306 executes processing of conversion from a floating point format to a fixed point format, with respect to a decimal, as the conversion process, but there is no limitation thereto. Another conversion process may be executed by the communication unit 306. Also, the communication unit 306 can send a command sequence that is determined in advance in a range of the SD standard to the auxiliary processing apparatus 100a, and receive a response from the auxiliary processing apparatus 100a. Accordingly, the communication unit 306 can perform communication between the image capturing apparatus 110a and the auxiliary processing apparatus 100a. Also, the communication unit 306 can communicate with the information processing apparatus 130 via the network 120.

Figure 4:
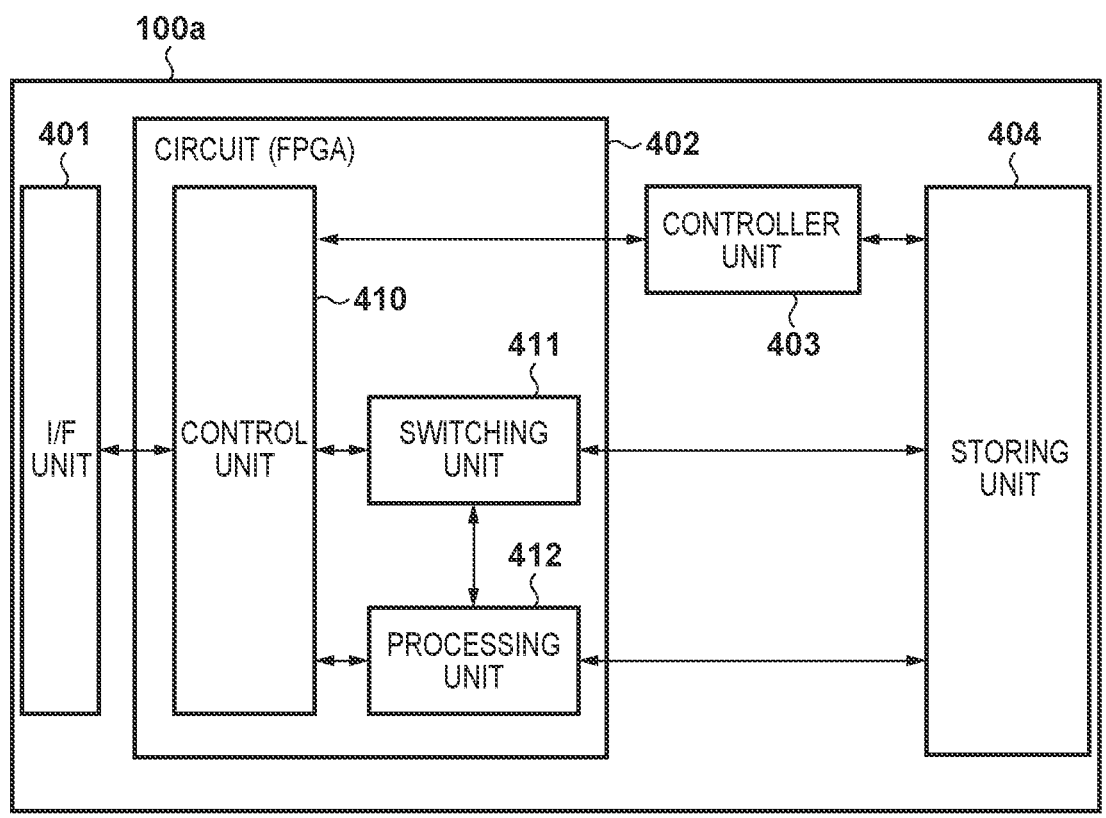
FIG. 4 is a configuration diagram of an auxiliary processing apparatus according to the present embodiment.

FIG. 4 is a diagram illustrating a configuration of the auxiliary processing apparatus 100a. The auxiliary processing apparatus 100a includes an I/F unit 401, a circuit 402 (FPGA), a controller 403, and a storing unit 404. Note that the auxiliary processing apparatuses 100b to 100d each include constituent elements similar to those of the auxiliary processing apparatus 100a. The auxiliary processing apparatus 100a has a shape conforming to the SD standard, for example, as a shape such that the auxiliary processing apparatus 100a can be inserted to and removed from the socket of the I/F unit 205 included in the image capturing apparatus 110a.

The I/F unit 401 is an interface portion for connecting an apparatus such as the image capturing apparatus 110a and the auxiliary processing apparatus 100a. The I/F unit 401 is an electrical contact terminal or the like, receives power supply from the image capturing apparatus 110a, and generates and distributes power to be used inside the auxiliary processing apparatus 100a, for example. The I/F unit 401 conforms to the SD standard similarly to the I/F unit 205 of the image capturing apparatus 110a. Reception of images and setting data from the image capturing apparatus 110a and transmission of data from the circuit 402 to the image capturing apparatus 110a are executed via the I/F unit 401.

The circuit 402 includes a control unit 410, a switching unit 411, and a processing unit 412. The circuit 402 is an FPGA, and is one type of semiconductor device whose internal logic circuit structure can be repeatedly reconfigured. A processing function can be added to the image capturing apparatus 110a to which the auxiliary processing apparatus 100a is attached, with the use of the processing function that the circuit 402 has. Also, due to the reconfiguration function of the circuit 402, the logic circuit structure can be changed even after the logic structure has been set. Therefore, by attaching the auxiliary processing apparatus 100a to an apparatus (unshown) in a field in which technology progress is rapid, for example, the auxiliary processing apparatus 100a can execute processes suitable for the apparatus. Note that, in the present embodiment, an example in which the FPGA is used will be described, but a general-purpose ASIC and a dedicated LSI may also be used, as long as the processing similar to the FPGA can be realized, for example.

The circuit 402 is started by setting data including information of the logic circuit structure to be generated being written from a dedicated I/F, or the setting data being read out from the dedicated I/F. In the present embodiment, this setting data is retained in the storing unit 404. Upon power being supplied to the auxiliary processing apparatus 100a, the circuit 402 reads out the setting data from the storing unit 404, generates the logic circuit, and then starts. The starting method is not limited thereto, and the configuration may be such that a dedicated circuit is implemented in the auxiliary processing apparatus 100a, and the image capturing apparatus 110a writes setting data to the circuit 402 via the I/F unit 401, for example.

The control unit 410 includes a circuit for transmitting and receiving images between the image capturing apparatus 110a and the auxiliary processing apparatus 100a, a circuit for analyzing a command received from the image capturing apparatus 110a, and a circuit that performs control based on the analysis result. Commands are those that conform to the SD standard, and the control unit 410 can detect some of the commands. The control unit 410 performs control such that, when performing a storing process, images are sent to the controller 403, and when performing an image analyzing process, images are sent to the processing unit 412. Also, upon receiving setting data for performing switching of the processes, the control unit 410 sends the setting data to the switching unit 411. The switching unit 411 includes a circuit for acquiring information of an image analyzing processing function from the storing unit 404 and writing the information to the processing unit 412, based on the setting data received from the image capturing apparatus 110a. The information of the image analyzing processing function is setting parameters including a sequence, a type, and computation coefficients of computational operations to be processed in the processing unit 412, for example.

The processing unit 412 includes a plurality of computation circuits necessary for executing the image analyzing processing function. The processing unit 412 executes computational processes based on the information of the image analyzing processing function received from the switching unit 411. The processing unit 412 sends a processing result to the image capturing apparatus 110a, and records the processing result to the storing unit 404, as needed. As described above, the circuit 402 extracts setting data of the processing function to be executed by the processing unit 412 from pieces of setting data respectively corresponding to a plurality of processing functions that are stored in advance. The circuit 402 rewrites the processing details to be executed by the processing unit 412 based on the extracted setting data. Accordingly, the auxiliary processing apparatus 100a can selectively execute at least one of the plurality of processing functions. Also, by adding setting data of the newly adding process at any time, the image capturing apparatus 110a can cause the auxiliary processing apparatus 100a to perform the latest process.

In the following, the fact that a plurality of pieces of setting data respectively corresponding to a plurality of processing functions are retained is represented as having the plurality of processing functions. That is, when the circuit 402 of the auxiliary processing apparatus 100a can change the processing details of the processing unit 412 by setting data including another processing function, even in a state in which the circuit 402 is configured to one processing function, the circuit 402 has a plurality of processing functions.

The controller 403 is a known control IC (integrated circuit) conforming to the SD standard, and executes control of the slave operation of the SD protocol, and control of reading data from and writing data to the storing unit 404. The storing unit 404 is constituted by a NAND flash memory, for example, and stores various types of information such as storage data written by the image capturing apparatus 110a, information of an image analyzing processing function that is written by the processing unit 412, and setting data of the circuit 402.

Figure 5:
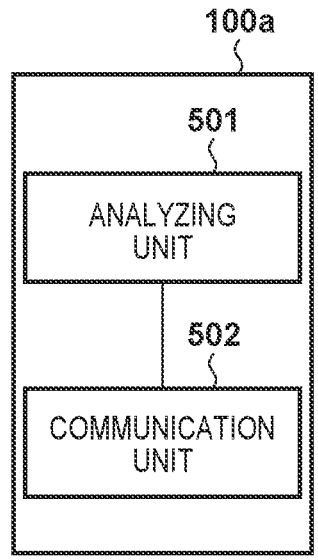
FIG. 5 is a block diagram illustrating functions of the auxiliary processing apparatus.

FIG. 5 shows an example of functions of the auxiliary processing apparatus 100a. The auxiliary processing apparatus 100a includes an analyzing unit 501 and a communication unit 502. The analyzing unit 501 executes analyzing process on an image. Upon receiving an input of an analyzing process setting request, the analyzing unit 501 executes setting for entering a state in which the analyzing process that has been input is executable, for example. Also, when an image is input to the auxiliary processing apparatus 100a, the analyzing unit 501 executes the analyzing process that is set to an executable state on the input image. In the present embodiment, the executable analyzing process includes a human body detection process and a face detection process, but there is no limitation thereto. For example, the executable analyzing process may be face authentication process that is a process for determining whether or not a person stored in advance is included in an image. The analyzing unit 501 calculates a degree of matching between the image feature amount of a person stored in advance and the image feature amount of a person detected in the input image, and if the matching degree is a threshold value or more, the analyzing unit 501 determines that the detected person is the person stored in advance, for example.

Also, the analyzing process may also be a process of overlaying a predetermined mask image or performing a mosaic process on a person detected from an input image, for the purpose of privacy protection. Also, the analyzing process may also be a process of detecting whether or not the person in an image is performing a specific action using a learning model obtained by performing learning of the specific actions of a person by machine learning. Furthermore, the analyzing process may also be a process of determining the type of an area in an image. For example, the analyzing process may also be a process of determining the type of an area in an image using a learning model obtained by performing learning of a building, a road, a person, the sky, and the like by machine learning, for example. As described above, the executable analyzing process can be applied to image analyzing process using machine learning, and to image analyzing process in which machine learning is not used. Also, each analyzing process described above may be executed in cooperation with the image capturing apparatus 110a, instead of being performed by the auxiliary processing apparatus 100a by itself. The communication unit 502 communicates with the image capturing apparatus 110a via the I/F unit 401.

Figure 6:
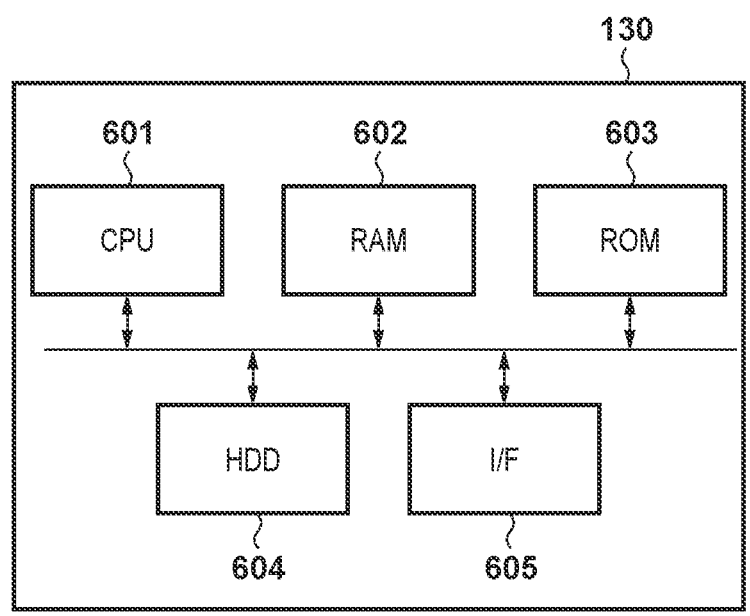
FIG. 6 is a configuration diagram of an input/output apparatus according to the present embodiment.

FIG. 6 shows an example of a configuration of the information processing apparatus 130. The information processing apparatus 130 is a common computer such as a PC, and includes a CPU 601, a RAM 602, a ROM 603, an HDD 604, and an I/F 605, as shown in FIG. 6, for example. The information processing apparatus 130 can execute various functions by the CPU 601 executing a program stored in a memory and a storage apparatus.

Figure 7:
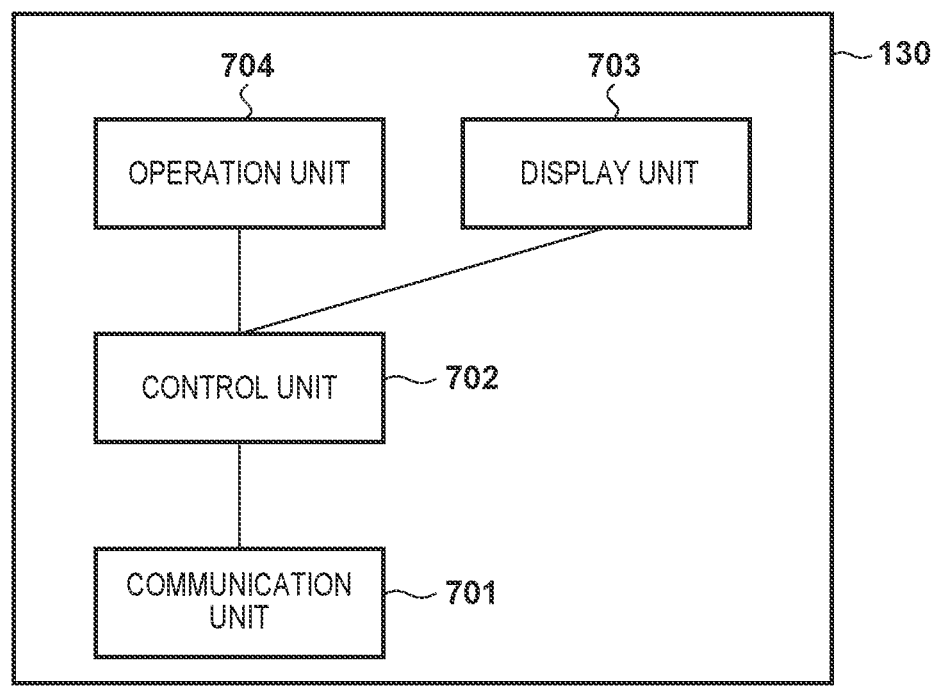
FIG. 7 is a block diagram illustrating functions of the input/output apparatus.

FIG. 7 shows an example of functions of the information processing apparatus 130 according to the present embodiment. The information processing apparatus 130 includes a communication unit 701, a control unit 702, a display unit 703, and an operation unit 704. The communication unit 701 is connected to the network 120, and executes communication with an external apparatus (unshown) such as the image capturing apparatus 110 via the network 120. There is no limitation thereto, and the communication unit 701 may secure a direct connection to the image capturing apparatus 110a, and communicate with the image capturing apparatus 110 without the network 120 and another apparatus intermediating the communication, for example. The control unit 702 performs control such that the communication unit 701, the display unit 703, and the operation unit 704 can execute respective processes.

The display unit 703 is a display including an LCD, an organic EL, and the like, and can present various types of information to a user. The display unit 703 displays a result of rendering (e.g., image) performed by a browser in the display, and the result is presented to a user. Note that information may also be sent to a user by sound, vibration, and the like, as a method other than display, for example. The operation unit 704 receives operations made by a user. The operation unit 704 is a mouse, a keyboard, and the like, and a user can input a user operation to a browser by the user operating these devices. There is no limitation thereto, and the operation unit 704 may be a touch panel, a microphone, and any device that can detect user intention, for example.

In the following, the flow of processes to be executed in the image capturing system 10 will be described. The processes to be executed by the image capturing apparatus 110a, out of the processes, are realized by a CPU in the computation processing unit 203 executing a program stored in a memory or the like. However, this is merely an example, and a portion or the entirety of later-described processes may be realized by dedicated hardware. Also, the processes to be executed by the auxiliary processing apparatus 100a and the information processing apparatus 130, respectively, are realized by CPUs of the respective apparatuses executing programs stored in memories or the like. Alternatively, a portion or the entirety of the aforementioned processes may be realized by dedicated hardware.

Figure 8:
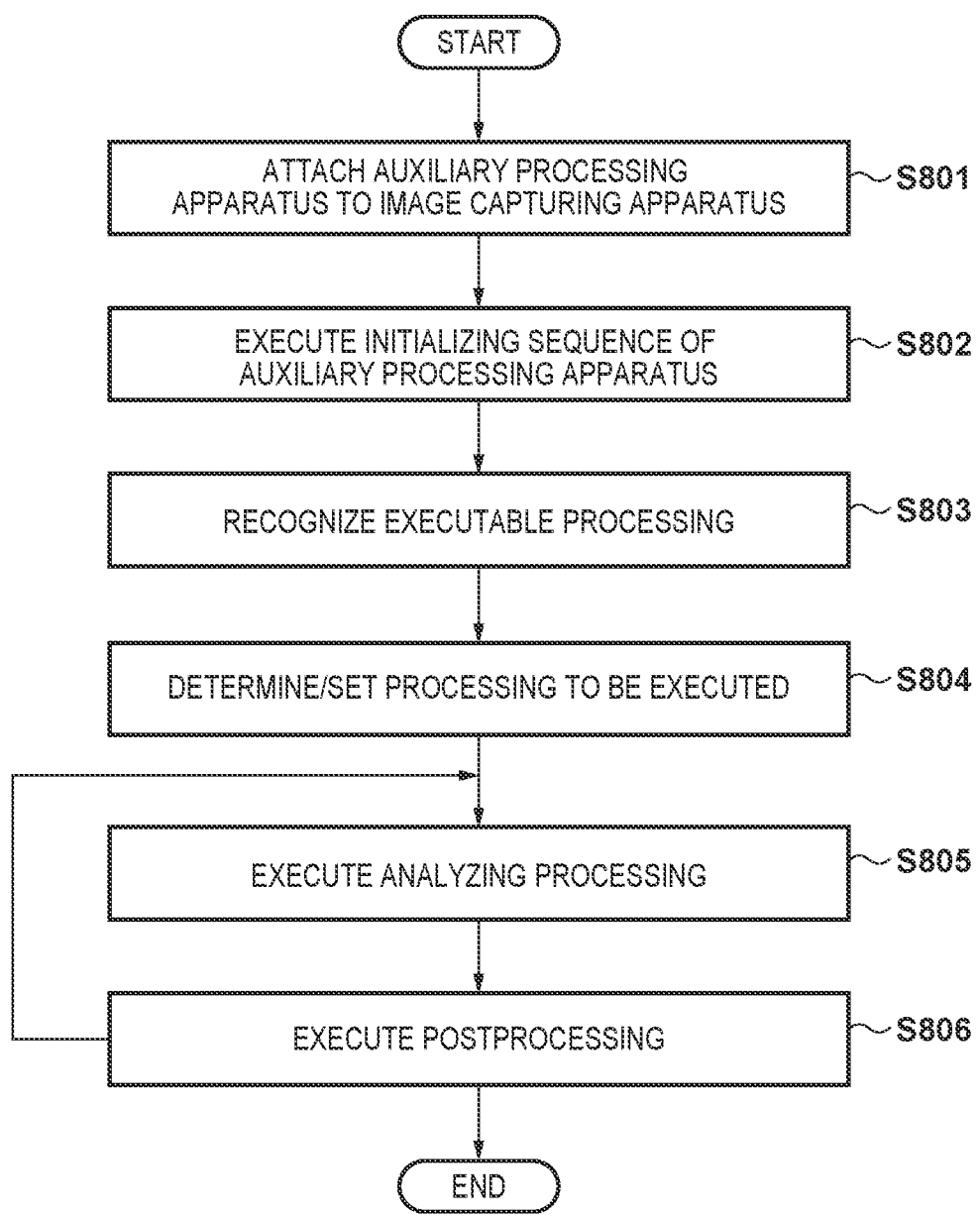
FIG. 8 is a flowchart of processing of the image capturing system according to the present embodiment.

FIG. 8 is a flowchart of image analyzing process to be executed in the image capturing system 10. In FIG. 8, a user attaches the auxiliary processing apparatus 100a to the image capturing apparatus 110a (S801). Next, the image capturing apparatus 110a executes an initializing sequence of the auxiliary processing apparatus 100a (S802). The initializing sequence is for causing the auxiliary processing apparatus 100a to enter a usable state, by the image capturing apparatus 110a sending a predetermined command to the auxiliary processing apparatus 100a. Thereafter, the image capturing apparatus 110a determines the processes that can be executed by the auxiliary processing apparatus 100a. The determination of processes may be performed for only the image capturing apparatus 110a or for the combination of the image capturing apparatus 110a and the auxiliary processing apparatus 100a (S803). Note that the auxiliary processing apparatus 100a is configured to execute an arbitrary process, but the auxiliary process need not include processes irrelevant to the process that should be executed by the image capturing apparatus 110a.

For example, the image capturing apparatus 110a may retain a list of processes that can be executed by the auxiliary processing apparatus 100a, the list being acquired from the information processing apparatus 130 in advance. In this case, the image capturing apparatus 110a can determine the processes that can be executed by the auxiliary processing apparatus 100a based on the list of processes that can be executed by the auxiliary processing apparatus 100a. The image capturing apparatus 110a determines the process that is to be caused to be executed by the auxiliary processing apparatus 100a, and sets the determined process to the auxiliary processing apparatus 100a, as needed (S804). That is, when it is determined that at least a portion of processes of the executable processes is to be executed by the auxiliary processing apparatus 100a, the setting for performing the portion of processes is executed in the auxiliary processing apparatus 100a.

This setting includes performing reconfiguration of the circuit 402 using setting data corresponding to the portion of processes that is to be executed. After completing the reconfiguration of the circuit 402, the image capturing apparatus 110a or the auxiliary processing apparatus 100a executes a predetermined analyzing process (S805). Next, the image capturing apparatus 110a performs postprocessing on the analysis result (S806). Note that the processing in steps S805 and S806 is repeatedly executed, the number of repetition being predetermined. The series of processes in FIG. 8 is executed when the auxiliary processing apparatus 100a is attached to the image capturing apparatus 110a. For example, a configuration may be adopted in which, when the auxiliary processing apparatus 100a is removed from the image capturing apparatus 110a, the processing in step S803 is executed again, or at least a portion of the processes in FIG. 8 is repeatedly executed.

Figure 9:
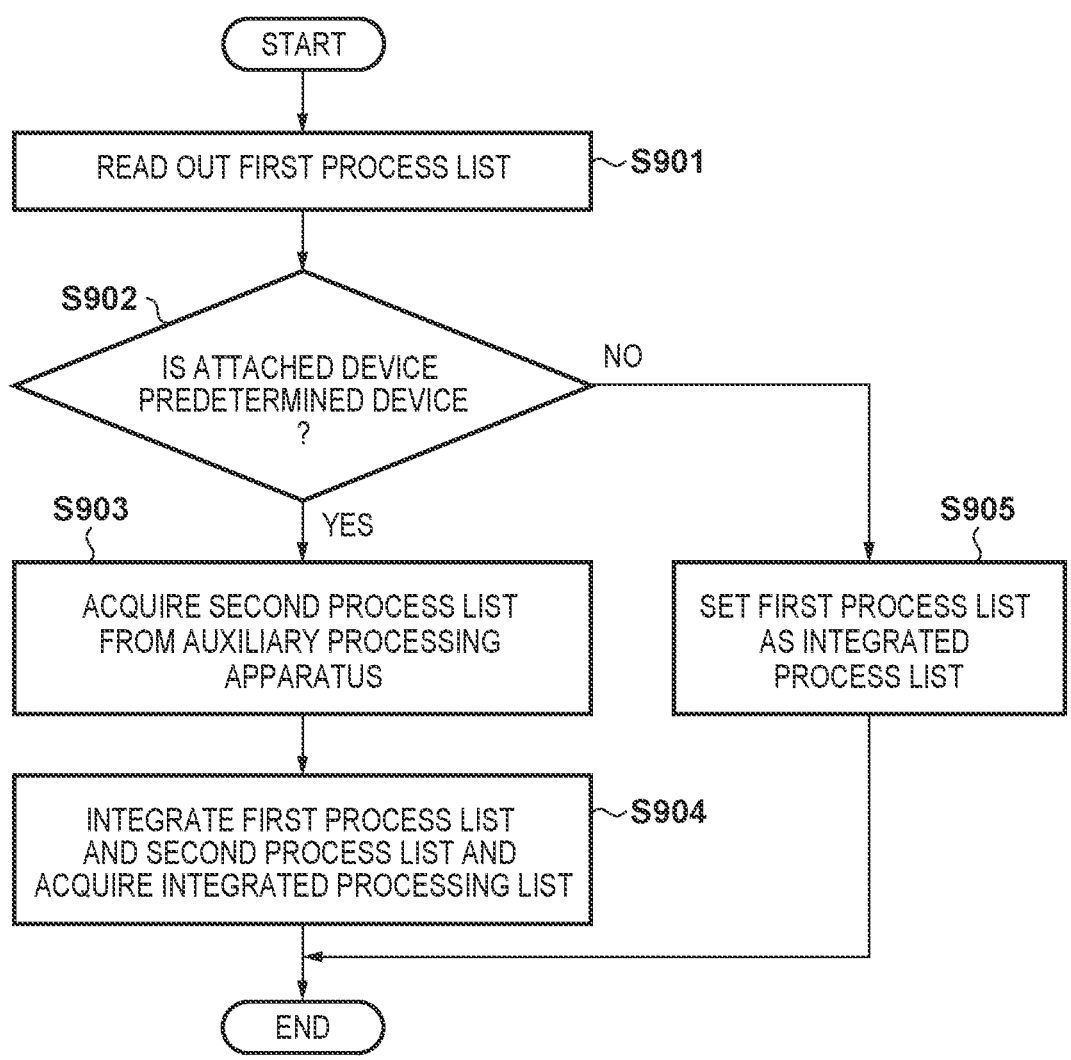
FIG. 9 is a flowchart of an analyzing process according to the present embodiment.

FIG. 9 shows a flowchart of processing for determining processes that can be executed by the image capturing apparatus 110a. This processing corresponds to the processing in step S803 in FIG. 8, and is executed when the auxiliary processing apparatus 100a or the like is attached to or removed from the image capturing apparatus 110a, and when the power supply of the image capturing apparatus 110a is turned on. In this processing, the image capturing apparatus 110a reads out processes that can be executed by the auxiliary processing apparatus 100a, integrates the processes and analyzing processes that can be executed by the image capturing apparatus 110a, and determines analyzing processes that can be executed by the image capturing apparatus 110a. In the following, the outline of this processing will be described.

First, the control unit 304 of the image capturing apparatus 110a reads out the first process list, which is a list of executable processes, and is stored in the storing unit 303 (S901). Next, the control unit 304 determines whether the attached device is a device having only a conventional storage function, for example, or a predetermined device having a specific processing function such as the auxiliary processing apparatus 100a (S902). For example, the control unit 304 issues a request (read command) for enabling reading out from a specific address to the attached device, by controlling the communication unit 306. The communication unit 306 reads out flag data stored at the specific address of the attached device. In the following, this specific address is denoted as an "address A". The details of data stored at the address A will be described later. Then, the control unit 304 determines whether or not the attached device is the auxiliary processing apparatus 100a having the specific processing function based on the read-out flag data. Note that this is merely an example, and whether or not the attached device is the auxiliary processing apparatus 100a may be determined with another method.

If the attached device is the auxiliary processing apparatus 100a (YES in step S902), the control unit 304 executes processes for determining processes that can be executed by the auxiliary processing apparatus 100a, and advances the processing to step S903. The control unit 304 communicates with the auxiliary processing apparatus 100a by controlling the communication unit 306, and acquires a second process list that is a list of processes that can be executed by the auxiliary processing apparatus 100a (S903). The control unit 304 acquires the second process list by reading out data stored at the address A, similarly to the case where whether or not the attached device is the auxiliary processing apparatus 100a is determined, for example.

Note that the second process list is stored at the same address A at which the flag data for determining whether or not the attached device is the auxiliary processing apparatus 100a is stored. In this case, the image capturing apparatus 110a acquires the flag data and the second process list at the same time by accessing the address A, and executes the processing in step S902 and the processing in step S903 at the same time. The flag data and the second process list may be stored at an address different from the address A. Thereafter, the control unit 304 generates an integrated process list in which the first process list of processes that can be executed by the image capturing apparatus 110a and that read out from the storing unit 303 and the second process list acquired from the auxiliary processing apparatus 100a are integrated (S904), and ends the processing.

The integrated process list is a list indicating the processes that the image capturing apparatus 110a can locally execute without an apparatus such as a server on the network 120 performing processing. Note that, in the present embodiment, the integrated process list is a list obtained as a sum of sets of the processes in the first process list and the processes in the second process list. Also, the integrated process list is a list of processes that are each included at least one of the first process list and the second process list. There is no limitation thereto, and when another process can be executed by combining processes in the first process list and the second process list, for example, the other process that becomes executable may be added to the integrated process list.

That is, when a new analyzing process becomes executable by executing at least some of the processes in the first process list and at least some of the processes in the second process list at the same time, the information regarding this analyzing process may be added to the integrated process list. For example, the face authentication process can be realized by a face detection processing function, a face feature extraction processing function, and a face feature matching processing function. Here, when the first process list includes the face detection processing function and the face feature extraction processing function, and the second process list includes the face feature matching processing function, the face authentication process may be included in the integrated process list.

Returning to step S902, if the attached device is not the auxiliary processing apparatus 100a (NO in step S902), the control unit 304 determines that no processes can be executed by the attached device. Therefore, the control unit 304 determines, as the integrated process list, the first process list that is read out from the storing unit 303 and is a list of processes that can be executed by the image capturing apparatus 110a (S905), and ends the processing. Note that when the attached device is removed from the image capturing apparatus 110a and the processing in FIG. 9 is executed, because the predetermined device is not present, the first process list is determined as the integrated process list.

Accordingly, based on whether or not the auxiliary processing apparatus 100a that can execute a specific process is attached to the image capturing apparatus 110a, the processes that the image capturing apparatus 110 can locally execute can be listed. Also, as a result of the display unit 703 of the information processing apparatus 130 presenting the integrated process list to a user, the user can select a process that becomes locally executable in the image capturing apparatus 110a. Note that, in the present embodiment, a case where the integrated process list is generated is illustrated, but the configuration may also be such that the first process list and the second process list are separately managed, and the integrated process list is not generated. That is, as a result of distinguishably managing the processes that can be executed by the auxiliary processing apparatus 100a and the processes that can be executed by the image capturing apparatus 110a, the generation of the integrated process list can be omitted.

On the other hand, even in a case where the first process list and the second process list are separately managed, the integrated process list may be generated. For example, when a new process becomes executable by using a process in the first process list and a process in the second process list at the same time, although the new process is not included in the processes in the first process list and the second process list, the new process may be included in the integrated process list. Note that when the integrated process list is output, information is output, with respect to each process in the integrated process list, for distinguishing between being included in the first process list, being included in the second process list, or being not included in the first and second process lists. Accordingly, a user can recognize whether or not a process presented in the display unit 703 can be executed without the auxiliary processing apparatus 100a.

Note that the integrated process list is presented in the display unit 703 of the information processing apparatus 130, but there is no limitation thereto. For example, when the image capturing apparatus 110a includes a display, the integrated process list may be displayed in the display. When the image capturing apparatus 110a has a sound output function, the integrated process list may be output using this function. As a result of the image capturing apparatus 110a presenting the integrated process list to a user, the user can quickly recognize the case where an auxiliary processing apparatus 100a having an unintended function is erroneously attached to the image capturing apparatus 110a. As described above, the image capturing apparatus 110a can output information based on the first process list indicating the processes that can be executed by the image capturing apparatus 110a and the second process list indicating the processes that can be executed by the auxiliary processing apparatus 100a, in an arbitrary format.

Also, when the auxiliary processing apparatus 100a is removed, the image capturing apparatus 110a can update the integrated process list by again executing the processing in FIG. 9. Here, the image capturing apparatus 110a discards the second process list regarding the auxiliary processing apparatus 100a that has been removed. There is no limitation thereto, and the image capturing apparatus 110a, by storing the second process list regarding the auxiliary processing apparatus 100a in the storing unit 303, can output the second process list even when the auxiliary processing apparatus 100a is not attached. That is, the image capturing apparatus 110a may output the second process list regarding an auxiliary processing apparatus 100a that was attached to the image capturing apparatus 110a and removed, in the past. Also, the image capturing apparatus 110a may output a process that becomes executable by combining a process in the second process list and a process in the first process list. That is, the image capturing apparatus 110a can output information regarding the processes that can be executed by the image capturing apparatus 110a independently. Here, the fact that an auxiliary processing apparatus 100a is present that can handle a process that cannot be executed by the image capturing apparatus 110a independently may be notified to the user.

Furthermore, the image capturing apparatus 110a may output the second process list regarding an auxiliary processing apparatus 100a that has not been attached to the image capturing apparatus 110a, in the past, and can be attached to the image capturing apparatus 110a. The information indicating such an auxiliary processing apparatus 100a and the analyzing process that the auxiliary processing apparatus 100a can execute may be acquired by the image capturing apparatus 110a from an external server (unshown) via a network. Also, the information indicating executable analyzing processes may be retained in the storing unit 303 of the image capturing apparatus 110a, in advance. Also, the image capturing apparatus 110a may output a process that becomes executable by combining a process in the second process list regarding an auxiliary processing apparatus 100a that is not attached and a process in the first process list. That is, the image capturing apparatus 110a can output information regarding a process that cannot be executed independently. Here, the image capturing apparatus 110a may notify a user of the fact that there is an auxiliary processing apparatus 100a that can handle the process that cannot be executed independently by the image capturing apparatus 110a.

Note that the image capturing apparatus 110a, when storing the second process list regarding an auxiliary processing apparatus 100a that is not attached thereto, can store information with which the device can be specified such as a model number of the auxiliary processing apparatus 100a in association therewith. The image capturing apparatus 110a can output information with which the auxiliary processing apparatus 100a can be specified, when outputting the second process list. Accordingly, a user can easily recognize which auxiliary processing apparatus 100a is to be attached to the image capturing apparatus 110a in order to use a processing function presented in the display unit 703.

Figure 10:
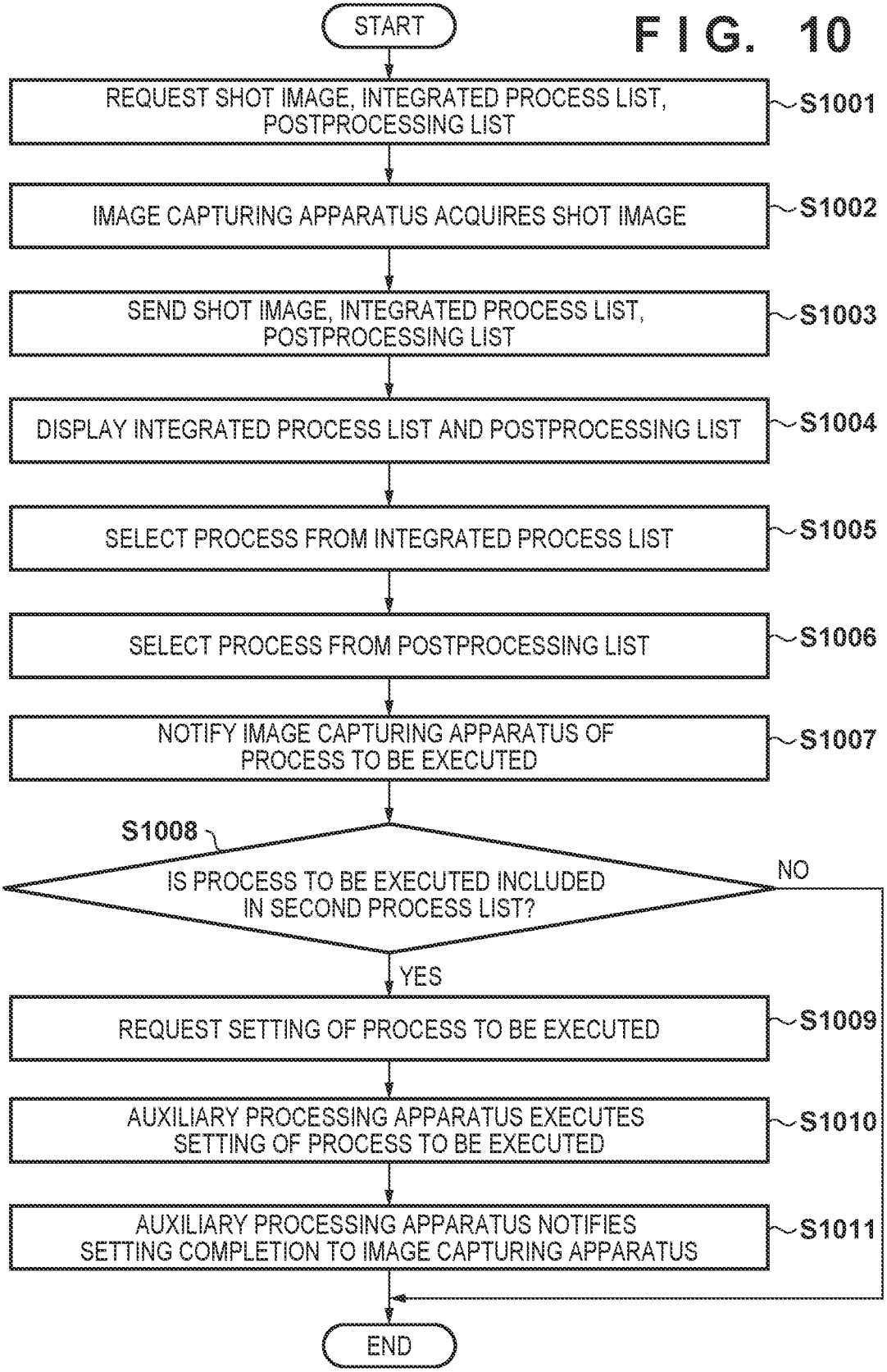
FIG. 10 is a flowchart of determining details of the analyzing process according to the present embodiment.

FIG. 10 shows a flowchart of processing performed by the image capturing apparatus 110a in order to determine analyzing process details. In this processing, the information processing apparatus 130 presents analyzing processes that the image capturing apparatus 110a can locally execute to a user, the information processing apparatus 130 receives the selection made by the user, and sends the received information to the image capturing apparatus 110a. The image capturing apparatus 110a determines the analyzing process to be executed according to the information of user selection received from the information processing apparatus 130. In the following, the outline of this processing will be described.

In FIG. 10, the control unit 702 of the information processing apparatus 130 requests a shot image, an integrated process list, and a postprocessing list to the image capturing apparatus 110a via the communication unit 701 (S1001). Here, the information processing apparatus 130 makes a request of information to be received from the image capturing apparatus 110a by sending a request message conforming to the ONVIF standard to the image capturing apparatus 110a, for example. There is no limitation thereto, and sending request of information may be performed by another request message or the like. The image capturing apparatus 110a shoots the surrounding environment based on this request via the image capturing control unit 301, and the control unit 304 processes an image that has been shot by controlling the signal processing unit 302, and as a result, the image capturing apparatus 110a acquires a shot image (S1002). Note that the image capturing apparatus 110a may acquire a shot image by shooting the surrounding environment regardless of whether or not the information processing apparatus 130 has requested.

The image capturing apparatus 110a may locally save the shot image in the storing unit 303, or may save the shot image in an external apparatus such as a network server. Next, the control unit 304 reads out the postprocessing list stored in the storing unit 303. The postprocessing list includes a display process and a saving process, but there is no limitation thereto. The control unit 304 sends the postprocessing list, the integrated process list acquired in the processing in FIG. 9, and the shot image acquired in step S1002 to the information processing apparatus 130 (S1003). The image capturing apparatus 110a sends a response message in response to the request message conforming to the ONVIF standard to the information processing apparatus 130. Accordingly, the information processing apparatus 130 can receive information.

The control unit 702 receives the shot image, the integrated process list, and the postprocessing list from the image capturing apparatus 110a. The control unit 702 presents the integrated process list and the postprocessing list on a screen of the display unit 703 or the like, to a user (S1004). Here, the control unit 702 may display the shot image on the screen along with the aforementioned lists. The user checks the integrated process list and the postprocessing list that are displayed in the display unit 703. The user selects an arbitrary analyzing process from the integrated process list via the operation unit 704 (S1005). Also, the user selects arbitrary postprocessing to be performed on an analyzing processing result via the operation unit 704 (S1006). The operation unit 704 sends the result of selection made by the user regarding the analyzing process and the postprocessing to the control unit 702. The control unit 702 sends pieces of information respectively indicating the analyzing process and the postprocessing that are received from the operation unit 704 to the image capturing apparatus 110a (S1007).

Upon receiving the information indicating the analyzing process selected by the user from the information processing apparatus 130, the control unit 304 of the image capturing apparatus 110a determines whether or not the analyzing process is included in the second process list (S1008). Next, if it is determined that the analyzing process selected by the user is not included in the second process list (NO in step S1008), the control unit 304 executes the analyzing process in the image capturing apparatus 110a. Accordingly, the control unit 304 ends the processing without making notification to the auxiliary processing apparatus 100a. On the other hand, if it is determined that the analyzing process selected by the user is included in the second process list (YES in step S1008), the control unit 304 advances the processing to step S1009. The control unit 304 sends a setting request regarding the analyzing process selected by the user to the auxiliary processing apparatus 100a (S1009).

The communication unit 502 of the auxiliary processing apparatus 100a receives the setting request of the analyzing process selected by the user from the image capturing apparatus 110a. Here, the communication unit 502 determines the setting request of the analyzing process selected by the user based on the data amount of writing by the image capturing apparatus 110a and the type of writing command. The details of the determination method of the setting request will be described later. The communication unit 502 sends the setting request of the analyzing process selected by the user received from the image capturing apparatus 110a to the analyzing unit 501. The analyzing unit 501 executes setting, based on the setting request of the analyzing process selected by the user received from the communication unit 502, such that the auxiliary processing apparatus 100a enters a state in which the processing is executable (S1010). After completing the setting of the processing, the communication unit 502 sends a setting completion notification to the image capturing apparatus 110a (S1011). Note that the communication unit 502 notifies the image capturing apparatus 110a of the information for causing the image capturing apparatus 110a not to write data to the auxiliary processing apparatus 100a until the process setting of the auxiliary processing apparatus 100a is completed. The communication unit 502 may notify the image capturing apparatus 110a of information regarding a setting completion schedule before the process setting is completed. The control unit 304 of the image capturing apparatus 110a receives a completion notification of the process setting from the auxiliary processing apparatus 100a by controlling the communication unit 306.

The completion notification of the process setting from the auxiliary processing apparatus 100a to the image capturing apparatus 110a may be executed using any one of the following three methods, for example. With the first notification method, when the image capturing apparatus 110a is performing writing processing of data of the first block, and the setting of the analyzing process selected by the user is not completed, the communication unit 502 outputs a BUSY signal. Outputting of the BUSY signal is performed by driving a signal line of DATA conforming to the SD standard to a low state, for example. In this case, the image capturing apparatus 110a can determine whether or not the setting of the analyzing process selected by the user is completed by checking the BUSY signal.

With a second notification method, the time until the setting of the analyzing process selected by the user is completed is stored at the aforementioned specific address in advance, and the image capturing apparatus 110a reads out the time until the setting is completed. After elapsing the time until the setting of the analyzing process selected by the user is completed, the image capturing apparatus 110a issues a write command as an output of write data. Accordingly, the image capturing apparatus 110a can, after the setting of the analyzing process selected by the user is completed, send data of the shot image to the auxiliary processing apparatus 100a. With a third notification method, when the setting of the analyzing process selected by the user is completed, the analyzing unit 501 writes a setting completion flag at a second specific address of the auxiliary processing apparatus 100a. The image capturing apparatus 110a can determine whether or not the setting of the analyzing process selected by the user is completed by reading out the data at the second specific address. Note that the information regarding the second specific address at which the setting completion flag is written may be stored at the aforementioned specific address, or may be stored at another address.

With the processing in FIG. 10, as a result of using the integrated process list, the analyzing process selected by the user can be appropriately determined, while considering the state of the image capturing apparatus 110a. Also, as a result of automatically performing the setting of the auxiliary processing apparatus 100a when the analyzing process selected by the user includes a process that is executed in the auxiliary processing apparatus 100a, the setting operation by the user is not needed. Furthermore, the auxiliary processing apparatus 100a automatically performs preparation for executing the analyzing process selected by the user. When the analyzing process selected by the user does not include a process to be executed by the auxiliary processing apparatus 100a, the image capturing apparatus 110a can execute the process without changing the setting of the auxiliary processing apparatus 100a.

Figure 11:
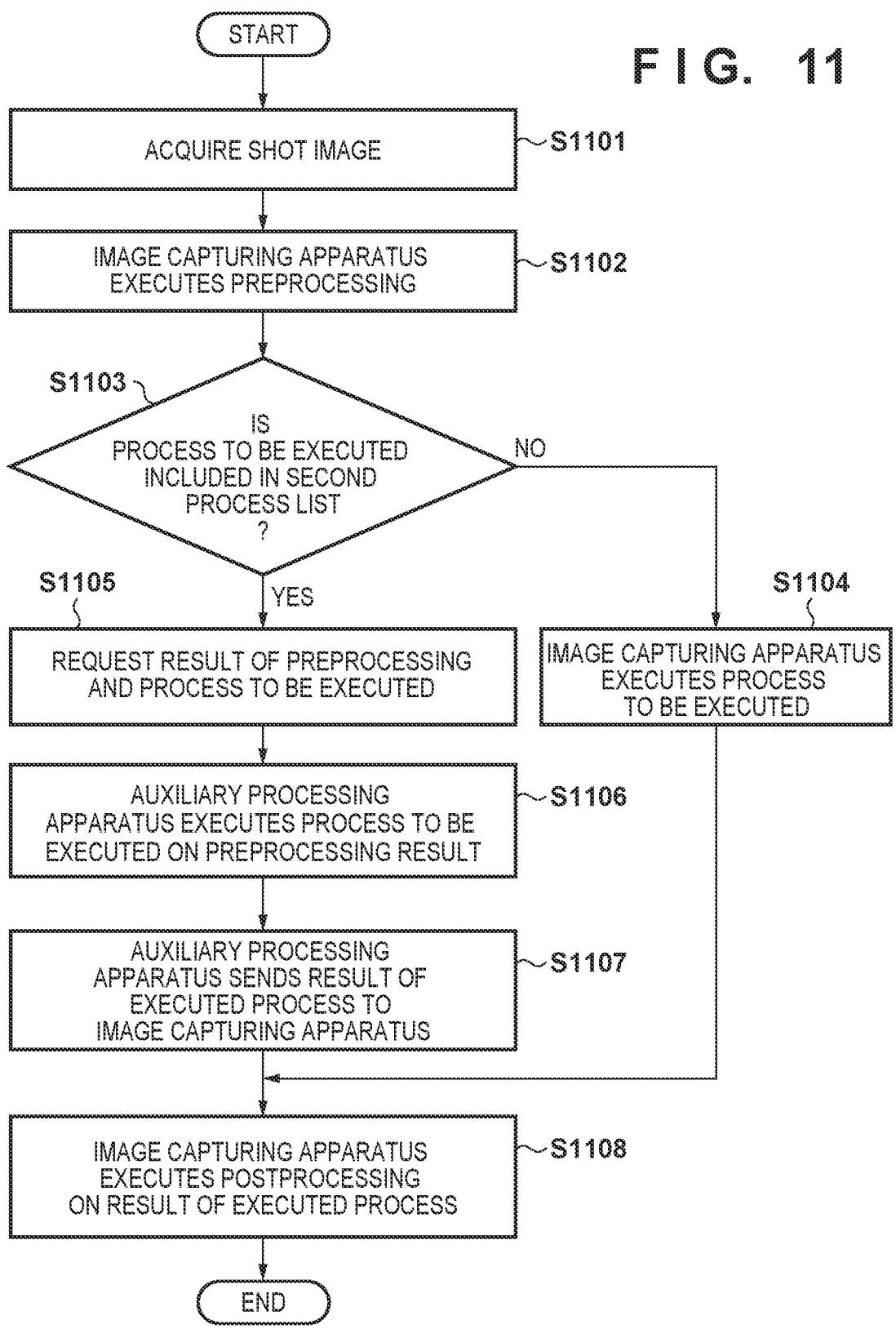
FIG. 11 is a flowchart of executing the analyzing process according to the present embodiment.

FIG. 11 shows a processing flowchart when the image capturing apparatus 110a executes the analyzing process. In FIG. 11, the image capturing control unit 301 shoots the surrounding environment (S1101). The control unit 304 performs processing on an image shot by the image capturing control unit 301 by controlling the signal processing unit 302, and acquires a shot image. Thereafter, the control unit 304 executes the processing before analysis on the shot image input from the control unit 304 by controlling the analyzing unit 305, and acquires an image, which is a result of the processing before analysis (S1102). The control unit 304 determines whether or not the analyzing process selected by the user is included in the second process list (S1103). If it is determined that the analyzing process selected by the user is not included in the second process list (NO in step S1103), the control unit 304 executes the analyzing process on the image, which is the result of the processing before analysis result, in the image capturing apparatus 110a (S1104). The control unit 304 executes the processing after analysis on the result of analyzing process by controlling the analyzing unit 305 (S1108), and ends the processing.

If it is determined that the analyzing process selected by the user is included in the second process list (YES in step S1103), the control unit 304 sends the image that is the result of processing before analysis to the auxiliary processing apparatus 100a (S1105). For example, the control unit 304 issues a write request (write command) of the result of processing before analysis, and sends an image that is the result of processing before analysis to the auxiliary processing apparatus 100a. The communication unit 502 of the auxiliary processing apparatus 100a receives an image that is the result of processing before analysis from the image capturing apparatus 110a, and sends the image to the analyzing unit 501. The analyzing unit 501 executes the analyzing process set in step S1010 on the image received from the communication unit 502 (S1106). The communication unit 502 sends the result of image analyzing process performed by the analyzing unit 501 to the image capturing apparatus 110a (S1107). The control unit 304 receives the result of image analyzing process from the auxiliary processing apparatus 100a by controlling the communication unit 306. The control unit 304 executes the processing after analysis on the result of analyzing process by controlling the analyzing unit 305 (S1108).

The transmission of the result of analyzing process from the auxiliary processing apparatus 100a to the image capturing apparatus 110a is performed as follows. The analyzing unit 501 stores the result of analyzing process at a storage address of the result of analyzing process that is assigned for every analyzing process selected by the user. The image capturing apparatus 110a reads out a storage address of the result of analyzing process that is stored at the address A along with the second process list, for example, and sends a read-out request of the storage address (read command) to the auxiliary processing apparatus 100a. The auxiliary processing apparatus 100a receives the read-out request of the storage address of the result of analyzing process via the communication unit 502, and sends the result of analyzing process to the image capturing apparatus 110a. Note that the image capturing apparatus 110a issues the read-out request of the storage address of the result of analyzing process, after elapsing the estimated processing time stored at the address A, for example.

The auxiliary processing apparatus 100a may output a BUSY signal in a period from when a write request of the last one block of the result of processing before analysis is issued until the analyzing process selected by the user is ended. Here, when the image capturing apparatus 110a no longer receives the BUSY signal of the auxiliary processing apparatus 100a, the image capturing apparatus 110a may issue a read-out request of the storage address of the result of analyzing process. Accordingly, the image capturing apparatus 110a can acquire the processing result after the auxiliary processing apparatus 100a has ended the analyzing process selected by the user. According to this processing, the image capturing apparatus 110 can determine whether or not the shot image is to be transferred to the auxiliary processing apparatus 100a according to the analyzing process selected by the user. Accordingly, the user can execute the analyzing process on a shot image without paying attention to which of the image capturing apparatus 110a and the auxiliary processing apparatus 100a will execute the analyzing process.

Figure 12:
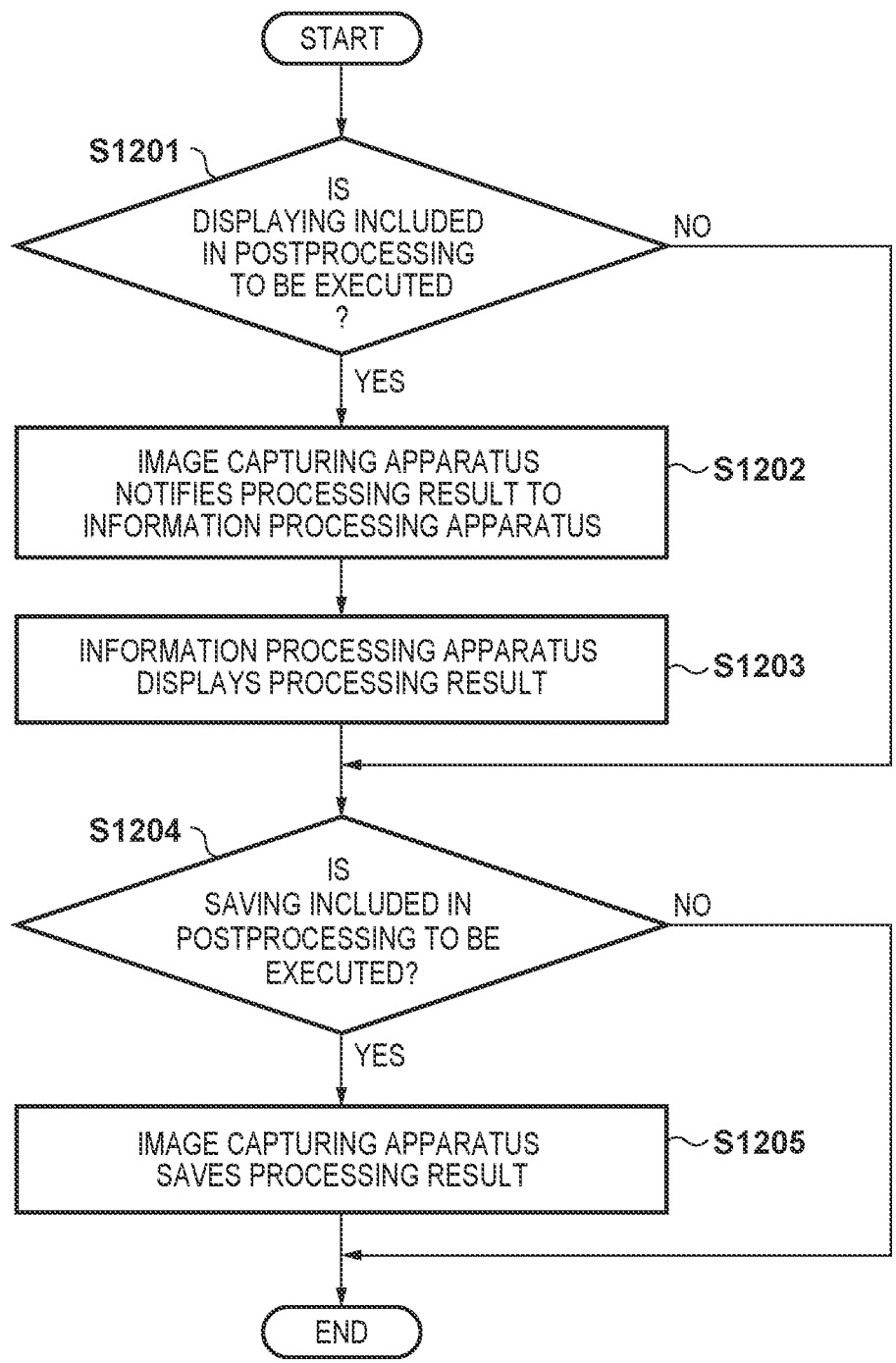
FIG. 12 is a flowchart of postprocessing according to the present embodiment.

FIG. 12 show a flowchart when the image capturing apparatus 110a executes the postprocessing. In FIG. 12, the control unit 304 of the image capturing apparatus 110a determines whether or not the postprocessing to be executed includes "displaying" (S1201). If it is determined that the postprocessing to be executed includes displaying (YES in step S1201), the control unit 304 advances the processing to step S1202. The control unit 304 sends the result of analyzing process to the information processing apparatus 130 by controlling the communication unit 306 (S1202). Upon receiving the result of analyzing process from the image capturing apparatus 110a, the control unit 702 of the information processing apparatus 130 presents the result of analyzing process to the user in the display unit 703 (S1203). On the other hand, if it is determined that the postprocessing to be executed does not include displaying (NO in step S1201), the control unit 304 advances the processing to step S1204 without performing the processing in steps S1202 and S1203.

The control unit 304 determines whether or not the postprocessing to be executed includes "saving" (S1204). Note that the determination in step S1204 may be executed before step S1201, or may also be executed in parallel to step S1201. If it is determined that the postprocessing to be executed includes saving (YES in step S1204), the control unit 304 advances the processing to step S1205. The control unit 304 stores the result of analyzing process in the storing unit 303, and ends the processing (S1205). On the other hand, if it is determined that the postprocessing to be executed does not include saving (NO in step S1204), the control unit 304 ends the processing without executing the processing in step S1205. As described above, the image capturing apparatus 110a can send the result of analyzing process to the information processing apparatus 130, and can store the result of analyzing process in the storing unit 303 according to the selected postprocessing, without the user performing an additional setting operation. According to this processing, the convenience of the user regarding the postprocessing can be improved.

In the following, the communication between the image capturing apparatus 110a and the auxiliary processing apparatus 100a will be described. The computation processing unit 203 and the controller 403 are connected by a power supply line, a GND line, a clock line, a command line, and a data line via a device insertion socket of the I/F unit 205. Note that the clock line, the command line, and the data line are connected so as to pass through the circuit 402. The clock line is for sending a synchronizing clock output from the computation processing unit 203. The command line is for sending and receiving an operation request command from the computation processing unit 203 to the controller 403 and a response from the controller 403 to the computation processing unit 203. The data line is for sending and receiving write data from the computation processing unit 203 and readout data from the auxiliary processing apparatus 100a.

Also, the computation processing unit 203 determines whether a device detection signal of the device insertion socket of the I/F unit 205 is High or Low. Accordingly, the computation processing unit 203 can recognize whether or not the auxiliary processing apparatus 100a is inserted. After starting supply of power to the controller 403, the computation processing unit 203 issues an operation request command to the controller 403 through the command line. Then, the computation processing unit 203 configures settings such as those of the voltage for data communication and the communication speed (clock frequency) according to a response from the controller 403 and reception of output data indicating device information as an SD card.

Figure 13A:
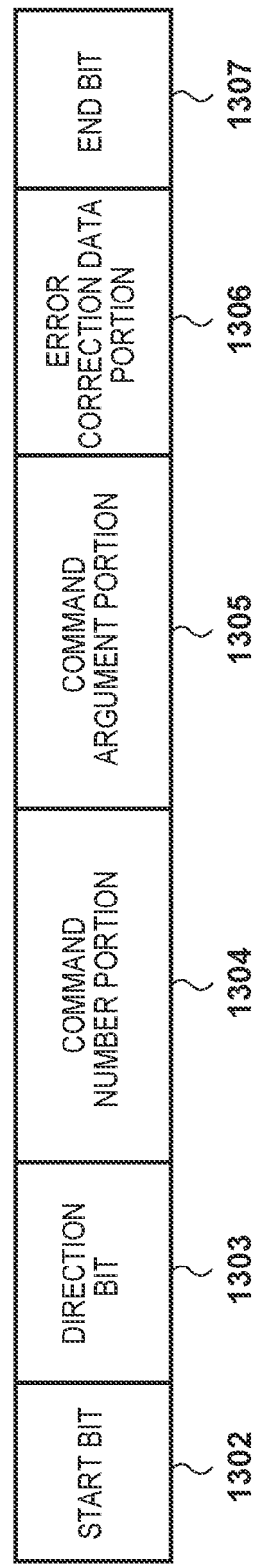
FIG. 13A is a configuration diagram of a command and a response according to the present embodiment.
Figure 13B:
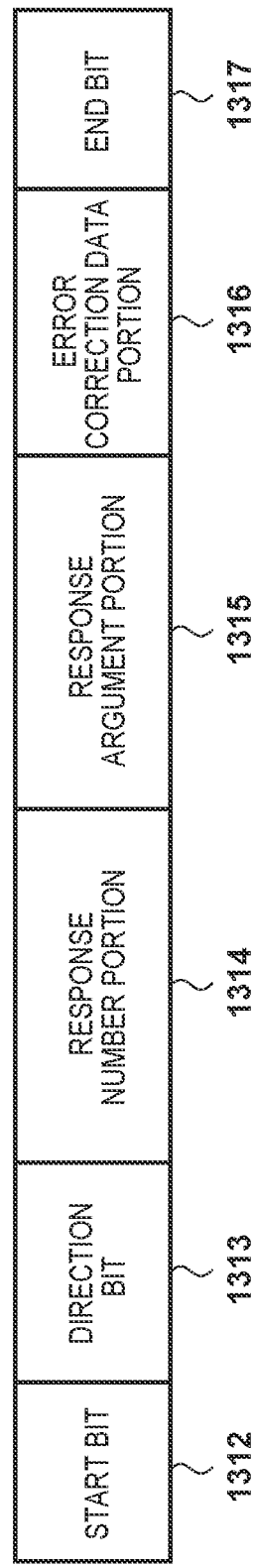
FIG. 13B is a configuration diagram of a command and a response according to the present embodiment.

FIGS. 13A and 13B are exemplary configuration of a command and a response that are communicated through the command line. The command and response are configured so as to be conformable to the SD standard. A command 1301 in FIG. 13A is a request command from the computation processing unit 203 to the controller 403. The command 1301 includes a start bit 1302, a direction bit 1303, and a command number portion 1304. The command 1301 further includes a command argument portion 1305, an error correction data portion 1306, and an end bit 1307. The start bit 1302 is arranged as the first bit of the command 1301 in order to indicate the start position of a command. The direction bit 1303 is for indicating that the signal is sent from the image capturing apparatus 110a to the auxiliary processing apparatus 100a.

A value indicating the type of a command is described in the command number portion 1304. For example, when a value "23" is stored in the command number portion 1304, the command 1301 is a block number designation command for designating the number of data blocks. Also, when a value "25" is stored in the command number portion 1304, the command 1301 is a multi-write command. When a value "12" is stored in the command number portion 1304, the command 1301 is a data transfer stop command. The command argument portion 1305 includes information such as a transfer number of data blocks and write/readout addresses of a memory, according to the type of the command. The end bit 1307 is arranged as the last bit of the command 1301 in order to indicate the end position of the command.

A response 1311 in FIG. 13B is a command that is sent from the controller 403 to the computation processing unit 203 in response to the command 1301. The response 1311 includes a start bit 1312, a direction bit 1313, and a response number portion 1314. The response 1311 further includes a response argument portion 1315, an error correction data portion 1316, and an end bit 1317. The start bit 1312 indicates the start position of the response as the first bit of the response 1311. The direction bit 1313 is for indication that the signal is output from the auxiliary processing apparatus 100a to the image capturing apparatus 110a. The response number portion 1314 indicates which of commands the response 1311 is issued to as the response. The response argument portion 1315 includes information such as a status of an SD card according to the type of a command. The end bit 1317 indicates the last position of the response as the last bit of the response 1311.

In the following, a method of sending and receiving data between the computation processing unit 203 and the auxiliary processing apparatus 100a will be described. The I/F unit 205 transfers data in units of blocks regarding writing/reading-out of data. The method of transferring data of a plurality of blocks from the computation processing unit 203 to the auxiliary processing apparatus 100a is as follows. In a first transfer method, after the number of blocks being designated by a block number designation command of transfer data, data in an amount corresponding to the designated number of blocks is transferred by the multi-write command. The block number designation command is for designating, in the command argument portion 1305, the number of blocks. The multi-write command is for designating, in the command argument portion 1305, the address of the storing unit 404 to which data is to be written. In a second transfer method, data transfer is started when the multi-write command is issued while the block number designation command is not issued. As a result of a transfer stop command being issued when data transfer is ended, the processing is ended. Here, only the address of the storing unit 404 to which data is to be written is designated in the command argument portion 1305 of the multi-write command. The computation processing unit 203 can arbitrarily switch between the aforementioned data transfer methods.

Note that when a storing process is performed in the analyzing process, for example, the circuit 402 inputs a command and data that are sent from the computation processing unit 203 to the controller 403. The controller 403 stores the received data at the address of the storing unit 404 designated by the command. When an image analyzing process is performed in the analyzing process, for example, the circuit 402 executes the analyzing process on data sent from the computation processing unit 203. The circuit 402 sends the processing result data and information for designating a predetermined address of the storing unit 404 to the controller 403. The controller 403 stores the processing result at the designated address of the storing unit 404.

The computation processing unit 203 reads out data of a plurality of blocks from the auxiliary processing apparatus 100a. Here, reading out of data is performed with the following two methods. In a first readout method, when the number of blocks is designated by a designation command of the number of blocks, a multi-read command is issued. In this method, only data of the number of blocks that is designated based on the designation command is read out. In the block number designation command, the number of blocks of readout data is designated in the command argument portion 1305. In the command argument portion 1305 of the multi-read command, the address of the memory from which data is to be read out is designated. In the second readout method, reading out of data is started when the multi-read command is issued while the block number designation command is not issued. In this method, as a result of issuing a transfer stop command, the processing is ended. The computation processing unit 203 can arbitrarily switch between the aforementioned two readout methods.

Note that when the write data and readout data are each one block, a single write command and a single read command are issued. Accordingly, writing and reading out of data are executed without the block number designation command and the transfer stop command being issued. In the single write command and the single read command, the address of the storing unit 404 that is to be accessed is designated in the command argument portion 1305. The computation processing unit 203 can send data on which a storing process or an image analyzing process are to be performed to the auxiliary processing apparatus 100a by performing writing to the auxiliary processing apparatus 100a. Also, the computation processing unit 203 can acquire image data stored in the storing unit 404, a processing result of the image analyzing process, and information regarding the processing function of the auxiliary processing apparatus 100a by performing reading from the auxiliary processing apparatus 100a.

The auxiliary processing apparatus 100a stores information regarding a processing function that the auxiliary processing apparatus 100a has at a specific address A of the storing unit 404. The computation processing unit 203 of the image capturing apparatus 110a can determine the information regarding the processing function of the auxiliary processing apparatus 100a by issuing a multi-read command or a single read command regarding this address A. The information regarding the processing function includes information indicating whether or not the processing function is retained, a required time from when the processing is started until the processing is ended, a data size of the processing result, and information of the address at which the processing result is to be stored.

FIG. 14 shows an example of information regarding the processing function. A processing function retaining flag 1401 indicates that the auxiliary processing apparatus 100a has the image analyzing processing function. The image capturing apparatus 110a determines whether or not the auxiliary processing apparatus 100a has the image analyzing processing function by checking the processing function retaining flag 1401. A process type 1402 indicates the analyzing processes that the auxiliary processing apparatus 100a has. An input data size 1403 and an input data number 1404 indicate information regarding the data input specification of the processing functions. Also, an estimated processing time 1405 indicates the time required from data input to processing result output. A processing result data number 1406 indicates the data number of processing results. An analysis result storage address 1407 indicates the addresses of the storing unit 404 at which the processing results are to be stored. The computation processing unit 203 can acquire a processing function table in FIG. 15 by reading out data at the address A of the storing unit 404 shown in FIG. 14. The reference numerals in FIG. 15 correspond to the reference numerals in FIG. 14.

Also, when the computation processing unit 203 has not issued a read command regarding the address A, the auxiliary processing apparatus 100a determines that the device to which the auxiliary processing apparatus 100a is attached is a device that does not use the image analyzing processing function. In this case, the auxiliary processing apparatus 100a only stores transferred data in the storing unit 404. Accordingly, the auxiliary processing apparatus 100a only functions as a memory device for a device that does not need the image analyzing processing function. Here, a method is illustrated in which information regarding the processing function is stored at the specific address A of the storing unit 404, but there is no limitation thereto. For example, information regarding the processing function may be added to a response argument portion 1315 of the response to a command used at the time of initial setting of the auxiliary processing apparatus 100a.

Note that the image capturing apparatus 110a executes reading from the address A of the storing unit 404, after the initializing setting of the auxiliary processing apparatus 100a is ended, for example. When the auxiliary processing apparatus 100a is no longer detected at the socket of the I/F unit 205, the image capturing apparatus 110a discards information that has been read so far. When the auxiliary processing apparatus 100a is inserted to the socket after discarding information, the image capturing apparatus 110a reads out the value at the address A after the initializing setting of the auxiliary processing apparatus 100a is ended. Accordingly, when a different auxiliary processing apparatus a is inserted, the image capturing apparatus 110a can read out the information regarding the processing function of the auxiliary processing apparatus a, and can set the processing in accordance thereto.

The processing performed when the auxiliary processing apparatus 100a automatically switches between a storing process and an image analyzing process will be described. This processing is processing for determining whether the auxiliary processing apparatus 100a stores image data received from the image capturing apparatus 110a as is or the auxiliary processing apparatus 100a performs an image analyzing process on the image data. The image capturing apparatus 110a can perform control such that the auxiliary processing apparatus 100a is caused to store sent image data or is caused to execute an image analyzing process on the image data by sending a special command to the auxiliary processing apparatus 100a, for example. However, defining such a special command is not easy, because the standard to which the auxiliary processing apparatus 100a conforms to needs to be taken into consideration. In the present embodiment, the processing to be executed in the auxiliary processing apparatus 100a is switched without defining a special command with the following method. Note that, in the following exemplary processing, communication between the image capturing apparatus 110a and the auxiliary processing apparatus 100a is performed with a method conforming to the SD standard, but there is no limitation thereto. That is, the method need only be a method with which the processing to be described in the following can be performed using commands following the standard to which the auxiliary processing apparatus 100a conforms.

Figure 16:
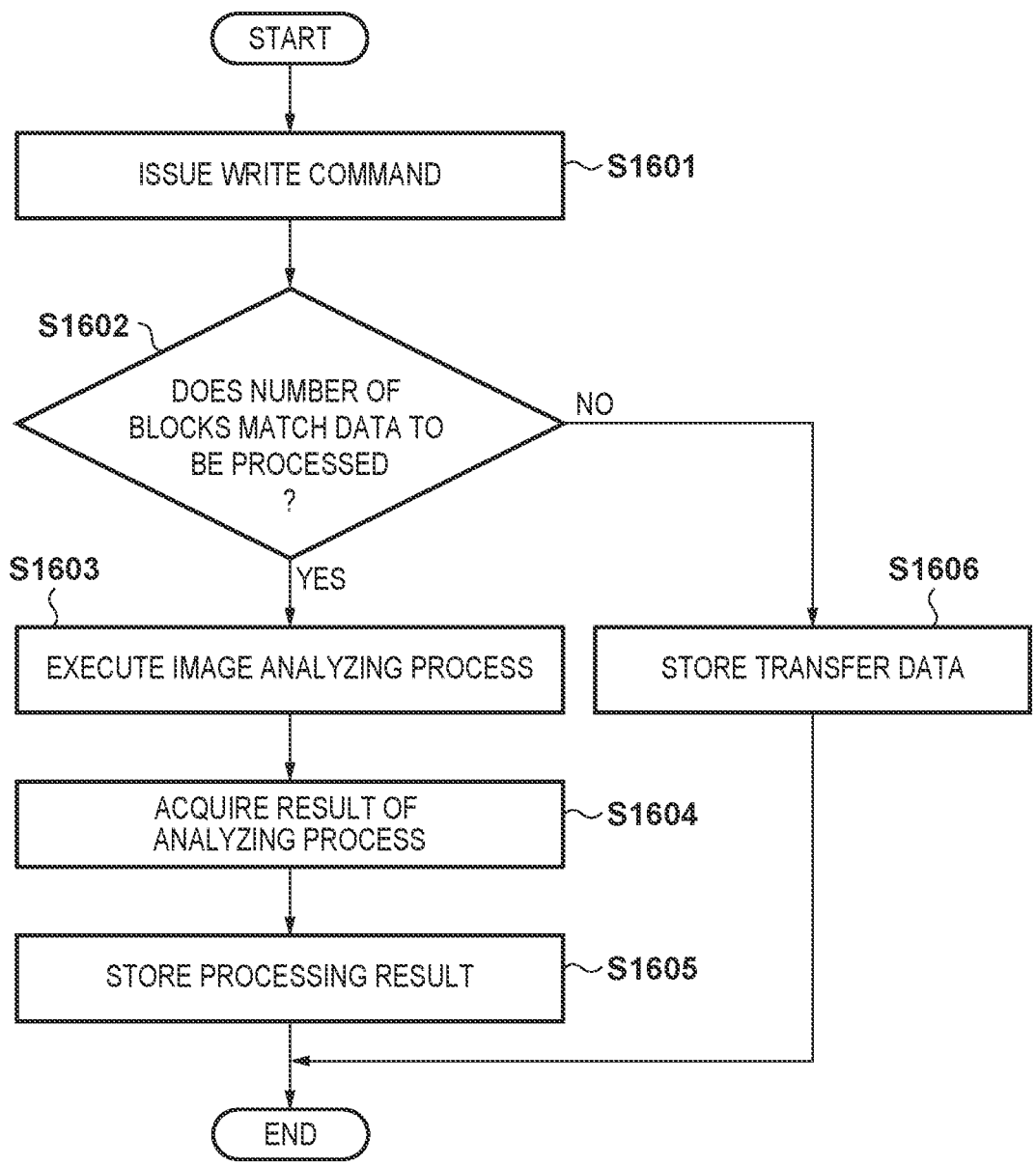
FIG. 16 is a flowchart of processing for switching between a storing process and an image analyzing process according to the present embodiment.

FIG. 16 shows a control flow for automatically switching between a storing process and an image analyzing process using the number of data blocks to be transferred to the auxiliary processing apparatus 100a. In FIG. 16, the computation processing unit 203 of the image capturing apparatus 110a issues a write command conforming to the SD standard to the auxiliary processing apparatus 100a, and the auxiliary processing apparatus 100a transfers data (S1601). The circuit 402 of the auxiliary processing apparatus 100a determines whether or not the number of blocks of data to be written by the computation processing unit 203 matches the data amount when an image analyzing process is executed (S1602). The circuit 402 determines the number of data blocks described in the command argument portion 1305 of the block number designation command. Also, when the block number designation command is not issued, the circuit 402 may count the number of blocks transferred until the data transfer stop command is issued, and determine the number of data blocks based on the count number.

If it is determined that the number of data blocks to be written into the computation processing unit 203 matches the data amount when an image analyzing process is executed (YES in step S1602), the circuit 402 advances the processing to step S1603. The circuit 402 executes the image analyzing process on the transferred data (S1603). The circuit 402 acquires an image analyzing process result (S1604), and issues a write command to the controller 403. The circuit 402 stores the acquired image analyzing process result at an analysis result storage address 1407 of the storing unit 404 corresponding to the type of the analyzing process (S1605). On the other hand, if it is determined that the number of data blocks to be written into the computation processing unit 203 does not match the data amount when the image analyzing process is executed (NO in step S1602), the circuit 402 advances the processing to step S1606. The circuit 402 stores the transferred data to the storing unit 404 as is (S1606). For example, the circuit 402 issues a command similar to the write command that the computation processing unit 203 has issued to the controller 403, and transfers the transferred data to the storing unit 404 as is. The controller 403 stores the transferred data at an address of the storing unit 404 designated by the write command.

The auxiliary processing apparatus 100a retains the information shown in FIG. 14 at the specific address A of the storing unit 404, and determines that the input data number 1404 when an analyzing process A of the process type 1402 is to be executed is 20 blocks, for example. Therefore, if it is determined that the number of data blocks to be written to the circuit 402 by the computation processing unit 203 is 20 blocks, the circuit 402 executes the analyzing process A. If it is determined that the number of written data blocks is not 20 blocks, the circuit 402 does not execute the analyzing process A. Note that, if it is determined that the number of data blocks to be written by the computation processing unit 203 is 40 blocks, the circuit 402 executes the analyzing process C, for example. As described above, the analyzing process to be executed by the circuit 402 may be changed according to the number of data blocks to be input to the circuit 402.

Figure 17:
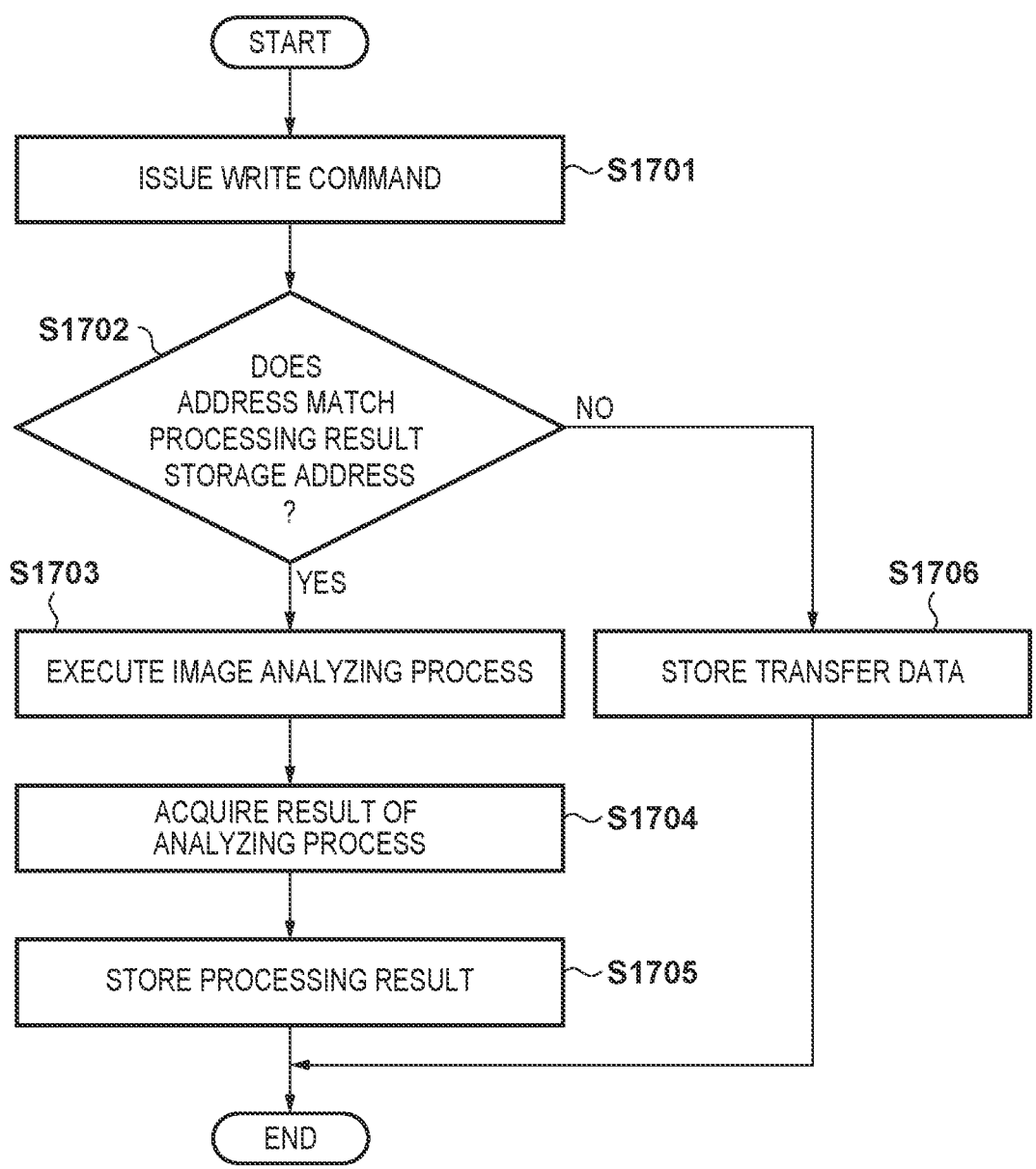
FIG. 17 is a flowchart of processing for switching between a storing process and an image analyzing process according to the present embodiment.

FIG. 17 shows an exemplary control flow for switching between a storing process and an image analyzing process based on a write address designated in the command argument portion 1305 of a write command. In this processing as well, the computation processing unit 203 of the image capturing apparatus 110a issues a write command to the controller 403 (S1701). The circuit 402 determines whether or not the write address designated in the command argument portion 1305 matches the analysis result storage address 1407 in FIG. 14 (S1702). If it is determined that the write address designated in the command argument portion 1305 matches the analysis result storage address 1407 (YES in step S1702), the circuit 402 advances the processing to step S1703. The circuit 402 executes the image analyzing process corresponding to the analysis result storage address 1407 on the transferred data (S1703).

The circuit 402 acquire a processing result of the image analysis (S1704), and issues a write command to the controller 403. The circuit 402 stores the acquired processing result of the image analysis at the analysis result storage address 1407 of the storing unit 404 (S1705). On the other hand, if it is determined that the write address designated in the command argument portion 1305 does not match the analysis result storage address 1407 (NO in step S1702), the circuit 402 advances the processing to step S1706. The circuit 402 stores the transferred data in the storing unit 404 as is (S1706). For example, the circuit 402 issues a command similar to the write command that the computation processing unit 203 has issued to the controller 403, and transfers the transferred data to the storing unit 404 as is. The controller 403 stores the transferred data at an address of the storing unit 404 designated by the write command.

The auxiliary processing apparatus 100a retains the information in FIG. 14 at the specific address A of the storing unit 404, and determines that the analysis result storage address 1407 when the analyzing process A of the process type 1402 in FIG. 15 is to be executed is 0xFFFFFFFF, for example. Therefore, if the analysis result storage address 1407 designated by the command acquired from the computation processing unit 203 is 0xFFFFFFFF, the circuit 402 executes the analyzing process A. If the analysis result storage address 1407 is not 0xFFFFFFFF, the circuit 402 does not execute the analyzing process A. Note that if the analysis result storage address 1407 designated by the command acquired from the computation processing unit 203 is 0xEEEEEEEE, the circuit 402 executes the analyzing process C, for example. As described above, the circuit 402 may change the analyzing process to be executed according to the analysis result storage address 1407 designated by a command.

As described above, the auxiliary processing apparatus 100a determines whether transferred data is to be stored or an image analyzing process is to be performed thereon, according to the number of data blocks to be written to the auxiliary processing apparatus 100a by the computation processing unit 203 and the analysis result storage address. Alternatively, the configuration may be such that, if it is determined that the number of data blocks and the analysis result storage address respectively match the input data number 1404 and the analysis result storage address 1407, the circuit 402 executes the image analyzing process. Also, the circuit 402 may execute the storing process if it is determined that at least one of the number of data blocks and the analysis result storage address does not match the input data number 1404 and the analysis result storage address 1407.

According to the processing described above, without providing a special control command, the auxiliary processing apparatus 100a can execute an image analyzing process on data on which the image analyzing process needs to be executed. Also, the auxiliary processing apparatus 100a can store data to be stored in the storing unit 404 without performing an image analyzing process. Accordingly, the system can be prevented from becoming complex, and further procedure needs not be provided. According to this processing, an image analyzing process can be quickly started. Note that the processing in FIG. 17 may be executed in combination with the processing in FIG. 16. That is, an image analyzing process may be executed as a result of the number of blocks of image data and the analysis result storage address being associated with the image analyzing process.

Note that, when an image analyzing process is performed, transferred data on which an analyzing process is to be performed may be saved, along with a processing result, in an area different from the analysis result storage address 1407 of the storing unit 404. Also, in the control described above, when the auxiliary processing apparatus 100a has a plurality of image analyzing processing functions, the type of the image analyzing process to be executed may be determined according to the number of write data blocks and the analysis result storage address. For example, if the number of data blocks and the analysis result storage address match the input data number 1404 and the analysis result storage address 1407 of one image analyzing process, of a plurality of image analyzing processing functions, the one image analyzing process may be executed.

Figure 18:
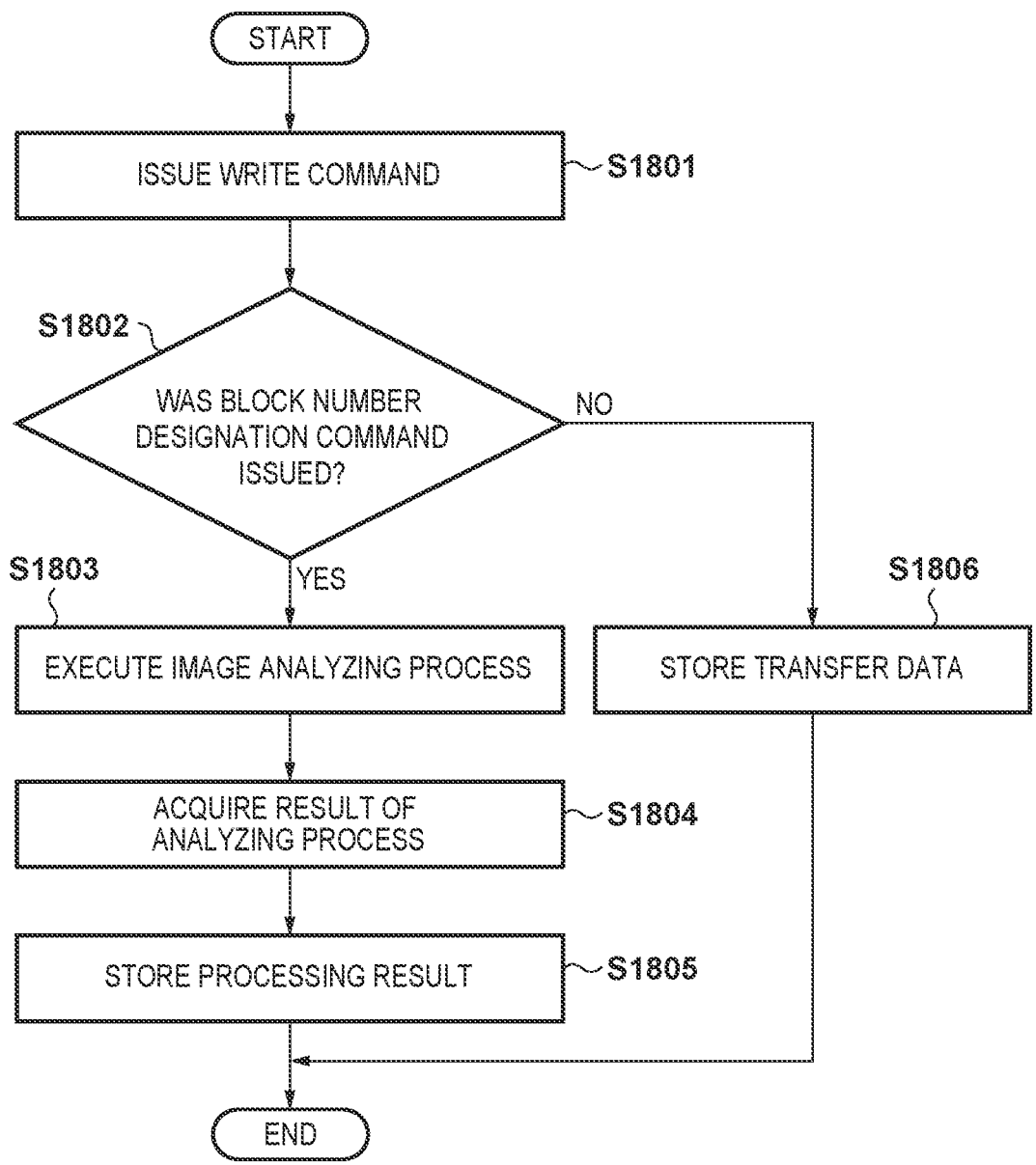
FIG. 18 is a flowchart of processing for switching between a storing process and an image analyzing process according to the present embodiment.

FIG. 18 shows an exemplary control flow for switching between a storing process and an image analyzing process by a command. In the SD standard, a first protocol is defined in which data writing is performed after issuing a block number designation command, as a protocol when data is to be written. Also, a second protocol is defined in which data is written without issuing the block number designation command in the first protocol. Note that, in the second protocol, a data transfer stop command is issued when ending data writing. In this processing, an image analyzing process is executed based on data transmission through the first protocol. When data is sent through the second protocol, a storing process for storing image data in the storing unit 404 is executed without executing an image analyzing process. Also, the circuit 402 of the auxiliary processing apparatus 100a determines whether or not an image analyzing process is to be executed based on whether or not the block number designation command has been issued for sending image data.

In this processing, the computation processing unit 203 of the image capturing apparatus 110a issues a write command to the auxiliary processing apparatus 100a, and transfers data (S1801). Here, the circuit 402 of the auxiliary processing apparatus 100a determines whether or not the block number designation command has been issued (S1802). If the block number designation command has been issued (YES in step S1802), the circuit 402 advances the processing to step S1803. The circuit 402 executes an image analyzing process on the transferred data (S1803), and acquires a processing result (S1804). The circuit 402 designates a predetermined analysis result storage address 1407 according to the type of the analyzing process shown in FIG. 14, and issues a write command to the controller 403. Accordingly, the circuit 402 stores processing result data in the storing unit 404 (S1805). If the block number designation command has not been issued (NO in step S1802), the circuit 402 advances the processing to step S1806. The circuit 402 issues a write command similar to the command issued from the computation processing unit 203 to the controller 403. Then, the circuit 402 sends the transferred data to the controller 403 as is. Also, the controller 403 stores the data at the address of the storing unit 404 designated by the write command from the circuit 402 (S1806).

Note that the block number designation command may be replaced by another predetermined command. The predetermined command for triggering execution of an image analyzing process may be set in advance. The circuit 402 executes an image analyzing process on input image data based on the reception of the predetermined command. Also, other information that is specifiable may be used as the protocol to be used. Note that, when a predetermined command has been received, the circuit 402 may determine whether or not an image analyzing process is to be executed on image data to be input, by executing the processing in FIG. 16 or 17, for example. As described above, which process of the image analyzing processes is to be performed is indicated by a command such as the block number designation command. Accordingly, the image capturing apparatus 110a can instruct the process to be executed by the auxiliary processing apparatus 100a, in a range of the protocol conforming to the SD standard.

In at least a portion of the processing described above, it is determined whether or not a command conforming to the SD standard for sending image data includes a value associated with an image analyzing process that can be executed by the circuit 402. Accordingly, with the portion of the processing described above, it can be determined whether or not an image analyzing process is to be executed. For example, in the processing in FIG. 16, when "23" is stored in the command number portion 1304, and a value indicating the predetermined number of blocks is stored in the command argument portion 1305, an image analyzing process is executed, for example. Also, in the processing in FIG. 17, when a value indicating the processing result storage address is stored in the command argument portion 1305, an image analyzing process is executed. In the processing in FIG. 18, when "23" is stored in the command number portion 1304, an image analyzing process is executed. As described above, the content of a command when image data is sent can be set to a predetermined value that is associated with an image analyzing process. Accordingly, the circuit 402 can be flexibly controlled to be caused to execute which of the image analyzing process and the storing process using a command conforming to the SD standard.

The method with which the image capturing apparatus 110a reads out an image analyzing process result stored in the auxiliary processing apparatus 100a will be described. The computation processing unit 203 designates the analysis result storage address 1407 shown in FIG. 14 to the auxiliary processing apparatus 100a. The computation processing unit 203 issues a read command to read out data in an amount corresponding to the processing result data number 1406 for an analyzing process. The controller 403 receives read commands via the circuit 402. The controller 403 outputs the processing result data stored at the designated address of the storing unit 404 to the computation processing unit 203 of the image capturing apparatus 110a. Accordingly, the image capturing apparatus 110a can acquire the image analyzing process result.

Figure 19:
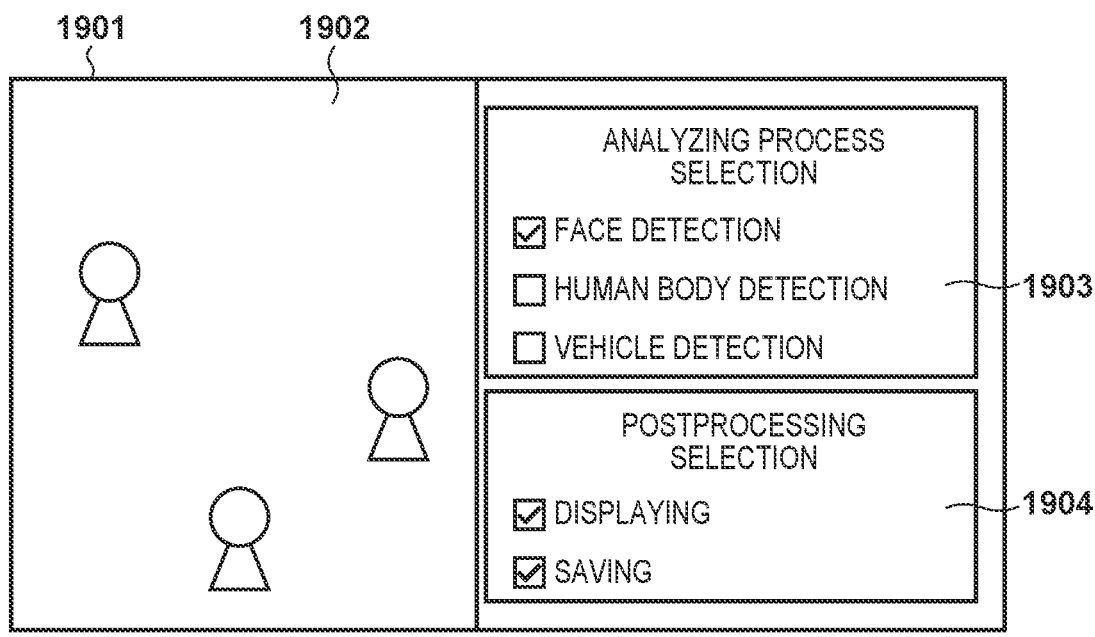
FIG. 19 shows a user interface according to the present embodiment.

An example of a method of presenting a shot image, an integrated process list, and a postprocessing list to a user, and a method of receiving user selection will be described. FIG. 19 shows an example of screen display of a shot image, an integrated process list, and a postprocessing list performed by the display unit 703. On the display screen, a user interface 1901 is displayed. The user interface 1901 includes a shot image display area 1902, an integrated process list display area 1903, and a postprocessing list display area 1904. An image shot by the image capturing apparatus 110a is displayed in the shot image display area 1902, and three persons are displayed in FIG. 19, for example. Analyzing process details are displayed in the integrated process list display area 1903, and a face detection process, a human body detection process, a vehicle detection process are displayed, for example. Displaying and saving are displayed in the postprocessing list display area 1904 as postprocessing details. A user can determine the shot image and the details of the integrated process list and the postprocessing list by checking these areas.

Note that the list to be displayed in the integrated process list display area 1903 is not limited to the integrated process list. For example, the image capturing apparatus 110a stores a second process list with respect to one auxiliary processing apparatus 100a in the storing unit 303. The image capturing apparatus 110a can send the second process list in the storing unit 303 to the information processing apparatus 130 even when the auxiliary processing apparatus 100a is not attached thereto. That is, the image capturing apparatus 110a may output a second process list regarding an auxiliary processing apparatus 100a that has been attached thereto in the past. In this case, the information processing apparatus 130 can display an analyzing process, in a grayout manner, that is included in the second process list and is not included in the integrated process list as an analyzing process that can be executable when the auxiliary processing apparatus 100a is attached. Accordingly, a message saying that the auxiliary processing apparatus 100a needs to be attached to the image capturing apparatus 110a can be presented to a user in order to make the process displayed in a grayout manner executable. Also, when the image capturing apparatus 110a and the auxiliary processing apparatus 100a have the same processing function, the functions may be integrated and displayed as one process. In this case, the image capturing apparatus 110a can determine which of the image capturing apparatus 110a and the auxiliary processing apparatus 100a will execute the process. The determination method will be described later.

Note that the information processing apparatus 130 may perform display such that a user can recognize which of the image capturing apparatus 110a and the auxiliary processing apparatus 100a will execute the analyzing process and postprocessing that are displayed to the user. For example, when generating the integrated process list, the image capturing apparatus 110a includes, in the integrated process list, information indicating in which of the first process list and the second process list each of the analyzing processes in the integrated process list is included. The information processing apparatus 130 can perform display such that the character colors of the analyzing processes are changed according to the aforementioned information. Accordingly, a user can check whether or not each of the processes is a process that is executable even if the auxiliary processing apparatus 100a is removed. Note that, when the image capturing apparatus 110a and the auxiliary processing apparatus 100a can execute the same process, and the process is displayed in an integrated manner, the following display is possible. Because the process is executable even if the auxiliary processing apparatus 100a is removed, this process is displayed with a color corresponding to the image capturing apparatus 110a. Note that there is no limitation thereto, and the process may be displayed with a color that indicates that the process is executable in both of the image capturing apparatus 110a and the auxiliary processing apparatus 100a.

Also, when a process that is executable when the image capturing apparatus 110a and the auxiliary processing apparatus 100a cooperate is included in the integrated process list, information indicating that the process needs cooperation may be included in the integrated process list. In this case, the process that is realized when the image capturing apparatus 110a and the auxiliary processing apparatus 100a cooperate may be displayed with yet another color. For example, the face authentication process is realized by a functional group including a face detection processing function, a face feature extraction processing function, and a face feature matching processing function. The image capturing apparatus 110a has the face detection processing function and the face feature extraction processing function, and the auxiliary processing apparatus 100a has the face feature matching processing function. In this case, the user interface 1901 displays the face detection process and the face feature extraction process with blue characters, the face feature matching process with red characters, and the face authentication process with green characters.

Note that changing of the character color is merely one mode of display for distinguishing whether each function is executed by the image capturing apparatus 110a, by the auxiliary processing apparatus 100a, or by the image capturing apparatus 110a and the auxiliary processing apparatus 100a working together. Such distinguishing display may be performed in another mode. For example, which of the apparatuses executes each process may be indicated by a background color of the process. Also, which of the apparatuses executes each process may be indicated by a character string. For example, a character string representing the image capturing apparatus 110a is added to a character string indicating a process to be executed by the image capturing apparatus 110a. A character string representing the auxiliary processing apparatus 100a is added to a character string indicating a process to be executed by the auxiliary processing apparatus 100a. Also, a character string indicating cooperation may be added to a character string indicating a process that is realized by cooperation between the image capturing apparatus 110a and the auxiliary processing apparatus 100a.

As described above, the image capturing apparatus 110a provides information for distinguishing between processes included in the first process list and processes included in the second process list to the information processing apparatus 130. Accordingly, the image capturing apparatus 110a can cause the display unit 703 of the information processing apparatus 130 to perform display such that which of the apparatuses executes the processes is distinguishable. Also, when the image capturing apparatus 110a includes a display unit as well, as a result of preparing information for distinguishing between processes included in the first process list and processes included in the second process list, which of the apparatuses executes the processes can be distinguishably displayed. That is, the image capturing apparatus 110a can display which of the apparatuses executes each of the processes in any display apparatus by outputting information for distinguishing between processes included in the first process list and processes included in the second process list.

A user can select an analyzing process from the integrated process list displayed in the integrated process list display area 1903 using the user interface 1901 through the operation unit 704. Also, the user can select postprocessing from a processing list displayed in the postprocessing list display area 1904 through the operation unit 704. For example, FIG. 19 shows an example of a case where the user selects the "face detection" process as the analyzing process, and selects "displaying" and "saving" as the postprocessing. Note that, in the present embodiment, an example in which one analyzing process is selected is illustrated, but there is no limitation thereto. A configuration may be adopted in which a user can select a plurality of analyzing processes. For example, at least one of "human body detection" and "vehicle detection" may be selected in addition to "face detection". Also, the configuration may be such that when one process is selected, other processes cannot be selected. As an example, a configuration may be adopted in which, when "human body detection" is selected in a state in which "face detection" is selected in the integrated process list display area 1903 in FIG. 19, the selection of "face detection" is canceled. Also, an example of a case where both of the two postprocesses are selected is shown in FIG. 19, but the configuration may be such that only one of these can be selected.

In step S1007 in FIG. 10, based on the user selection of the analyzing process and the postprocess, the selection result is notified to the image capturing apparatus 110a. Also, the control unit 702 may check the user selection state for every predetermined period, and notify the image capturing apparatus 110a of the process to be executed according to which of the processes is selected to be executed. That is, the processing in steps S1005 to S1007 in FIG. 10 may be regularly executed. Also, the configuration may be such that the selection in steps S1005 and S1006 is continuously monitored, and the processing in step S1007 is executed when the selection state changes.

Figure 20:
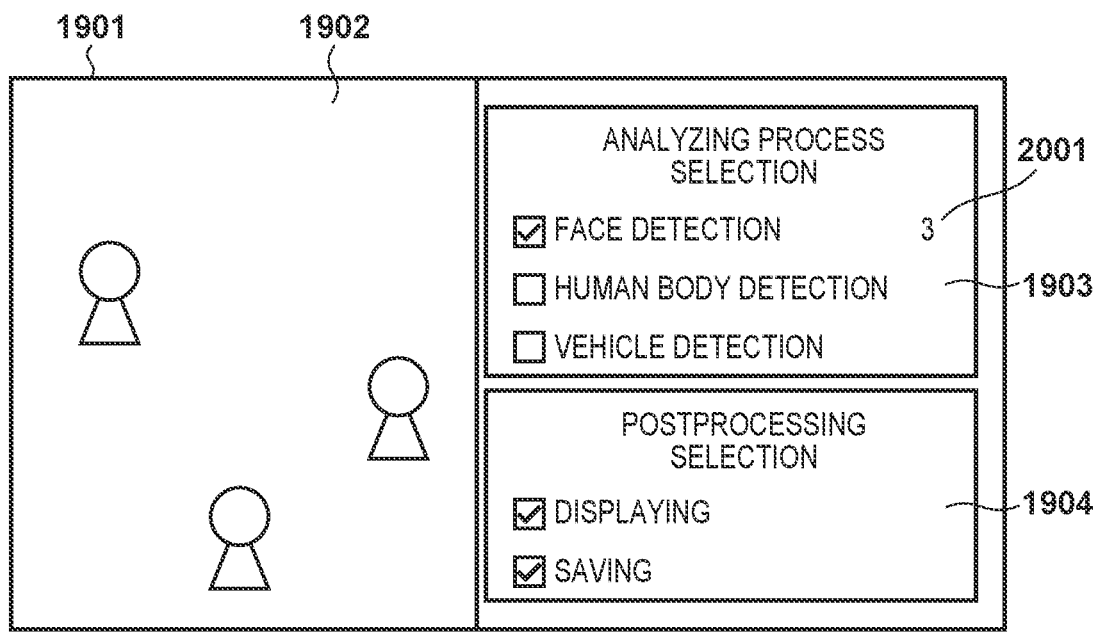
FIG. 20 shows a user interface for displaying a processing result according to the present embodiment.

FIG. 20 shows an example of an information display method in step S1203 when "face detection" is selected as the analyzing process to be executed and "displaying" is selected as the postprocess. In FIG. 20, on the screen of the user interface 1901 in FIG. 19, the number of persons 2001 detected in the face detection process is displayed as a result of the analyzing process. Note that the case shown in FIG. 20 is merely an example, and a processing result may be displayed separately from the user interface 1901, or a processing result may be displayed in a different area in the user interface 1901.

Also, a priority may be further set to the processes to be executed and the postprocesses that are selected by the user. For example, when a plurality of priorities are set to the processes to be executed, the control unit 304 of the image capturing apparatus 110a executes the processing in steps S1103 to S1107 in FIG. 11 in the order of priority with respect to the processes to be executed. Note that the computation resource of the image capturing apparatus 10a and the network resource may be assigned based on the priorities of the processes. For example, a process having a high priority may be executed on a video every first predetermined frames. Also, a process having a low priority may be executed on the video every second predetermined frames whose number is larger than the first predetermined frames. That is, the frequency of execution of processes may be determined based on the priorities. Also, the frequency of sending a result of process having a high priority to the information processing apparatus 130 may be higher than the frequency of sending a result of process having a low priority to the information processing apparatus 130.

There are cases where a predetermined process becomes executable by combining a plurality of processes. For example, the face authentication process becomes executable by combining a face detection process, a face feature extraction process, and a face feature matching process. Here, when the image capturing apparatus 110a and the auxiliary processing apparatus 100a are able to execute at least any of these three processes, the processes can be executed in a shared manner between these apparatuses. Also, the image capturing apparatus 110a and the auxiliary processing apparatus 100a can prepare different processing functions suitable for acquiring conditions of data to be processed (e.g., shooting condition) and conditions such as analysis target, with respect to at least one of the three processes described above, for example. For example, different processing functions may be prepared for processing to be performed on an image shot in the daytime and processing to be performed on an image shot at night.

Figure 21:
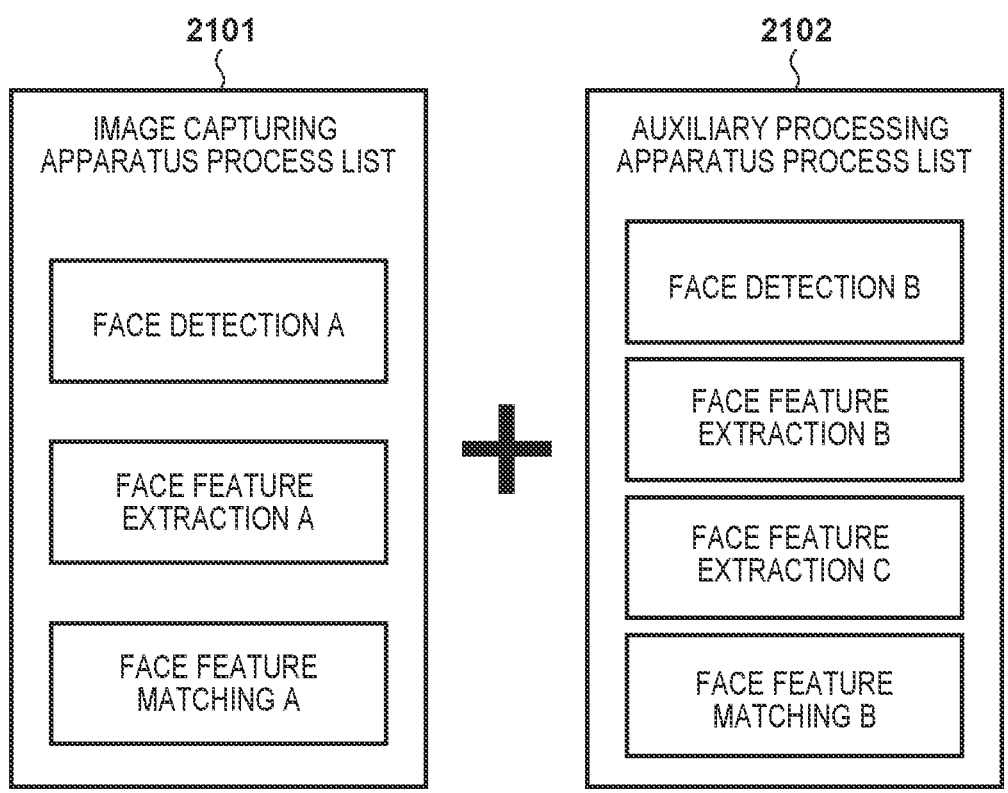
FIG. 21 is a diagram illustrating an image analyzing process group for face authentication process according to the present embodiment.

FIG. 21 shows a configuration in which the image capturing apparatus 110a and the auxiliary processing apparatus 100a have a face detection processing function, a face feature extraction processing function, and a face feature matching processing function, and can each execute the face authentication process. Even if the functions of the image capturing apparatus 110a and the auxiliary processing apparatus 100a are similar, the conditions that are suitable when the functions are used and the like are different. An image capturing apparatus process list 2101 includes face detection A, face feature detection A, and face feature matching A. An auxiliary processing apparatus process list 2102 includes face detection B, face feature extraction B, face feature extraction C, and face feature matching B. Also, similarly to that the auxiliary processing apparatus 100a has two face feature extraction processing functions (face feature extractions B, C), the image capturing apparatus 110a and the auxiliary processing apparatus 100a may have a plurality of processing functions that can execute similar processes. Accordingly, as a result of the image capturing apparatus 110a and the auxiliary processing apparatus 100a appropriately sharing processes, processes suitable for various conditions may be executed.

Note that even in a case where the same process will be performed, because the image capturing apparatus 110a and the auxiliary processing apparatus 100a are configured differently, there are merits and demerits when sharing processes. For example, regarding the computation accuracy, the computation processing unit 203 of the image capturing apparatus 110a has a wide data bit width and has high computation accuracy. Regarding computation speed, the circuit 402 of the auxiliary processing apparatus 100a has a high computation speed, because computational operations are performed by logic circuits. Also, when there are a plurality of processing functions that can execute the same process, it is advantageous if a suitable processing function is selected based on the environment of shooting performed by the image capturing apparatus 110a. Considering the factors described above, when the auxiliary processing apparatus 100a has processing functions, it is important to determine whether or not the processing functions will be used, and to appropriately select a processing function to be used.

In the following, a method of automatically making a selection from cases will be described, the cases being a case where the auxiliary processing apparatus 100a executes processes, a case where the image capturing apparatus 110*a* executes the processes, and a case where the image capturing apparatus 110*a* and the auxiliary processing apparatus 100*a* execute the processes in a cooperated manner. Also, when the image capturing apparatus 110*a* or the auxiliary processing apparatus 100*a* has a plurality of processing functions that can execute the same process, for example, a method of automatically selecting a processing function to be used from the plurality of processing functions will be described. Note that, in the following, three exemplary processes will be separately described, but these processes may be used in combination.

Figure 22:
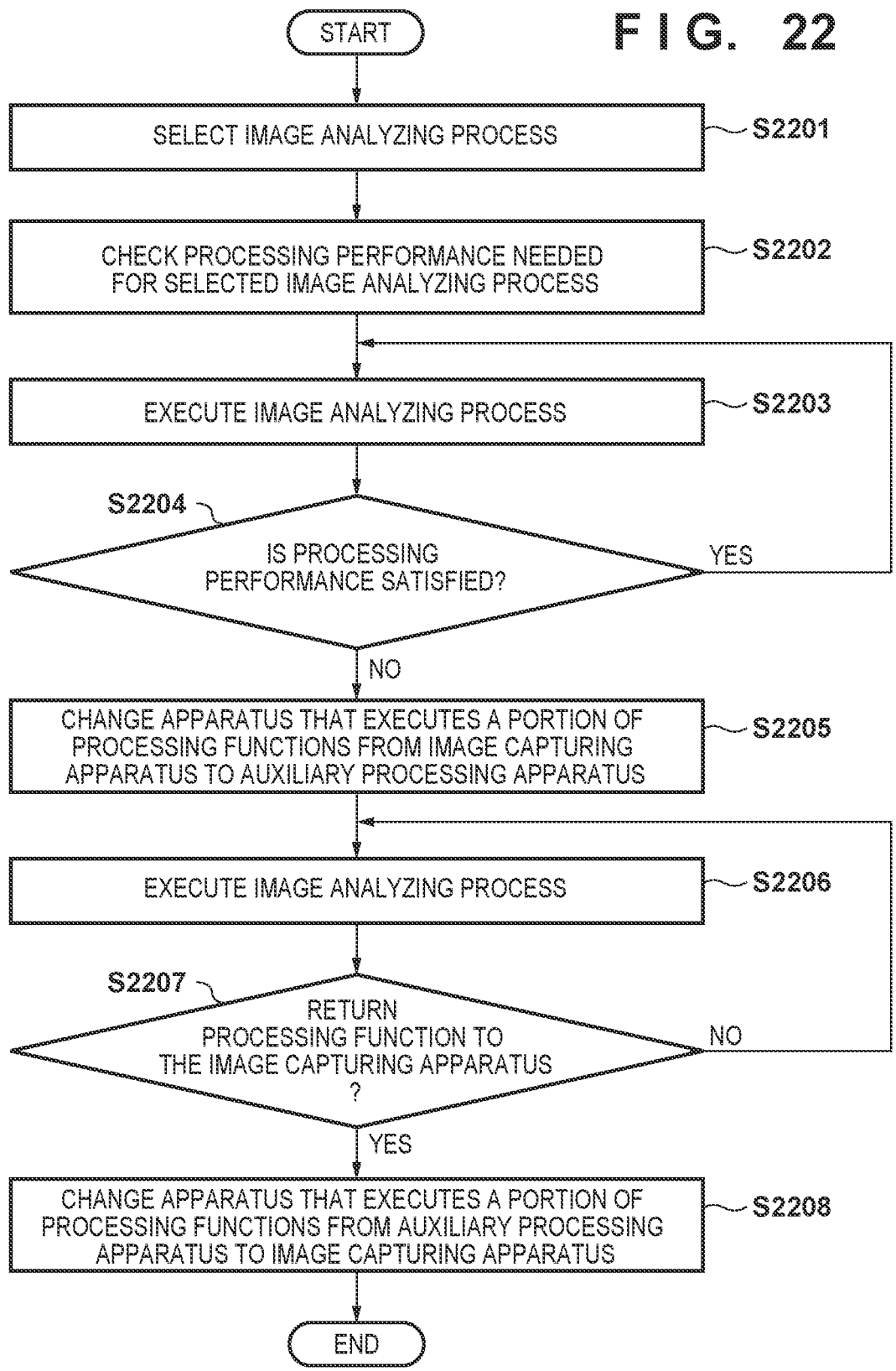
FIG. 22 is a flowchart illustrating a selecting process of processing functions according to the present embodiment.

In FIG. 22, a first processing example for selecting a processing function to be used is described. In FIG. 22, processing functions to be used are selected from the processing functions that the image capturing apparatus 110*a* and the auxiliary processing apparatus 100*a* have, such that performance needed for the desired image analyzing process is satisfied. For example, when the image capturing apparatus 110*a* and the auxiliary processing apparatus 100*a* can both execute the same process, and there are conditions such as that the process needs to be performed at a certain frame rate or more, this processing is executed.

In FIG. 22, a user selects an analyzing process to be executed through the user interface 1901 (S2201). The control unit 702 sends an execution instruction command of the analyzing process to be executed to the image capturing apparatus 110*a*, based on the user selection. The control unit 304 acquires the execution instruction command from the control unit 702. Note that, when the image capturing apparatus 110*a* has an information presentation function of presenting executable processes and an operation reception function of allowing a user to make a selection, the following mode may be adopted. The user may instruct the analyzing process to the control unit 304 of the image capturing apparatus 110*a* by directly operating the image capturing apparatus 110*a*.

The control unit 304 of the image capturing apparatus 110*a* checks the processing performance needed for executing the analyzing process selected by the user (S2202). Regarding the setting of processing performance, a setting value may be determined in advance for each process. A target value may be set by the user when selecting an analyzing process. Then, the control unit 304 executes the analyzing process selected in step S2201 in the image capturing apparatus 110*a* (S2203). Note that this processing may be executed in parallel with shooting. Also, among the processing functions to be used when executing the selected process, the functions that only the auxiliary processing apparatus 100*a* has are caused to be executed by the auxiliary processing apparatus 100*a*, and are not caused to be executed by the image capturing apparatus 110*a*.

The control unit 304 determines, while executing the process or after completing data processing of a fixed amount, whether or not the executed process satisfies the processing performance set in step S2202 (S2204). If it is determined that the processing performance is satisfied (YES in step S2204), the control unit 304 returns the processing to step S2203 in order to continue execution of the process. On the other hand, if it is determined that the processing performance is not satisfied (NO in step S2204), the control unit 304 advances the processing to step S2205 in order to change the process sharing to the one with which the processing performance is satisfied.

In step S2205, with respect to a process that is a portion of the processes performed in the image capturing apparatus 110*a* and is executable in the auxiliary processing apparatus 100*a* as well, the apparatus that executes the process is changed to the auxiliary processing apparatus 100*a*. The control unit 304 has already determined the processes that can be executed by the auxiliary processing apparatus 100*a*. The control unit 304 selects a process, from a list of the processes (second process list), that is caused to be executed by the auxiliary processing apparatus 100*a*, and changes the apparatus that executes the process. After completing the change processing, the control unit 304 and the analyzing unit 501 executes the process selected in step S2201 in a shared manner (S2206). Thereafter, the control unit 304 determines whether or not a processing function performed by the auxiliary processing apparatus 100*a* is returned to be performed by the image capturing apparatus 110*a* (S2207). As a result of returning to be performed by the image capturing apparatus 110*a*, the process can be executed with high computation accuracy.

If the reason why it was determined that the processing performance is not satisfied in step S2204 is being in a temporary high load state, for example, and the state is resolved, the control unit 304 determines that the processing function is returned to be executed by the image capturing apparatus 110*a*. That is, the control unit 304 determines which of the image capturing apparatus 110*a* and the auxiliary processing apparatus 100*a* will execute the processing function according to the processing load of the image capturing apparatus 110*a*. Note that there is no limitation to the operation that the auxiliary processing apparatus 100*a* is caused to execute a process in a state in which the processing load of the image capturing apparatus 110*a* is high, as described above. The image capturing apparatus 110*a* may be caused to execute a process when the processing load of the auxiliary processing apparatus 100*a* is high. That is, which of the image capturing apparatus 110*a* and the auxiliary processing apparatus 100*a* will execute a process may be determined based on the processing load of the auxiliary processing apparatus 100*a*.

Also, the control unit 304 determines that a process is returned to be executed by the image capturing apparatus 110*a* when the user reduces the target value of the processing performance. If it is determined that a process is returned to be executed by the image capturing apparatus 110*a* (YES in step S2207), the control unit 304 advances the processing to step S2208. With respect to a portion of processing executed by the auxiliary processing apparatus 100*a*, the control unit 304 changes the apparatus that executes the portion to the image capturing apparatus 110*a* (S2208). Note that the processing for returning the apparatus that executes the portion to the image capturing apparatus 110*a* in step S2208 may be a portion of the processes in which the apparatus that executes processes is changed to the auxiliary processing apparatus 100*a* in step S2205, or the entirety thereof. After the apparatus that executes at least a portion of processing is changed to the image capturing apparatus 110*a*, the processing is ended. On the other hand, if it is determined that the processing function is not returned to be executed by the image capturing apparatus 110*a* (NO in step S2207), the control unit 304 returns the processing to step S2206, and continues the processing without changing the process sharing.

Note that when the auxiliary processing apparatus 100*a* has a plurality of processing functions that can be executed with respect to the same process, execution may be performed in the following mode. After the apparatus that executes a portion of the processes is changed to the auxiliary processing apparatus 100*a*, if it is determined that the processing performance is not satisfied, the processing function may be changed to another processing function that executes the same function. That is, instead of switching the apparatus that executes processes, in step S2207, the apparatus that executes processes may be remained to be the auxiliary processing apparatus 100a, and only the processing function to be used may be changed.

Also, after the apparatus that executes a portion of the processes is changed to the auxiliary processing apparatus 100a, if it is determined that the processing performance is not satisfied in step S2202, the control unit 304 may return the apparatus that executes the portion of the processes to the image capturing apparatus 110a. Here, the control unit 304 stores the information indicating the processing performance as information indicating that processing performance cannot be satisfied with the auxiliary processing apparatus 100a that is currently attached.

Also, if similar processing performance or higher processing performance is required, the control unit 304 may not cause the auxiliary processing apparatus 100a to execute the processes. Similarly, if the processing performance cannot be satisfied even in a situation in which the processing load of the image capturing apparatus 110a is sufficiently small or the like, the control unit 304 may store the information regarding the processing performance. Here, if it is determined that the processing performance stored in step S2202 or a higher processing performance is needed in the later processes, the control unit 304 performs execution in the following mode. The control unit 304 changes the apparatus that executes a portion of the processes to the auxiliary processing apparatus 100a without executing the processing in step S2203.

According to the first processing example, the processing functions that the image capturing apparatus 110a and the auxiliary processing apparatus 100a have are selected such that the required processing performance is satisfied. The selected processing functions are executed by the apparatuses in a shared manner. Accordingly, appropriate process sharing is realized according to the state of the image capturing apparatus 110a or the like, and the processing performance can be kept at a favorable level.

Figure 23:
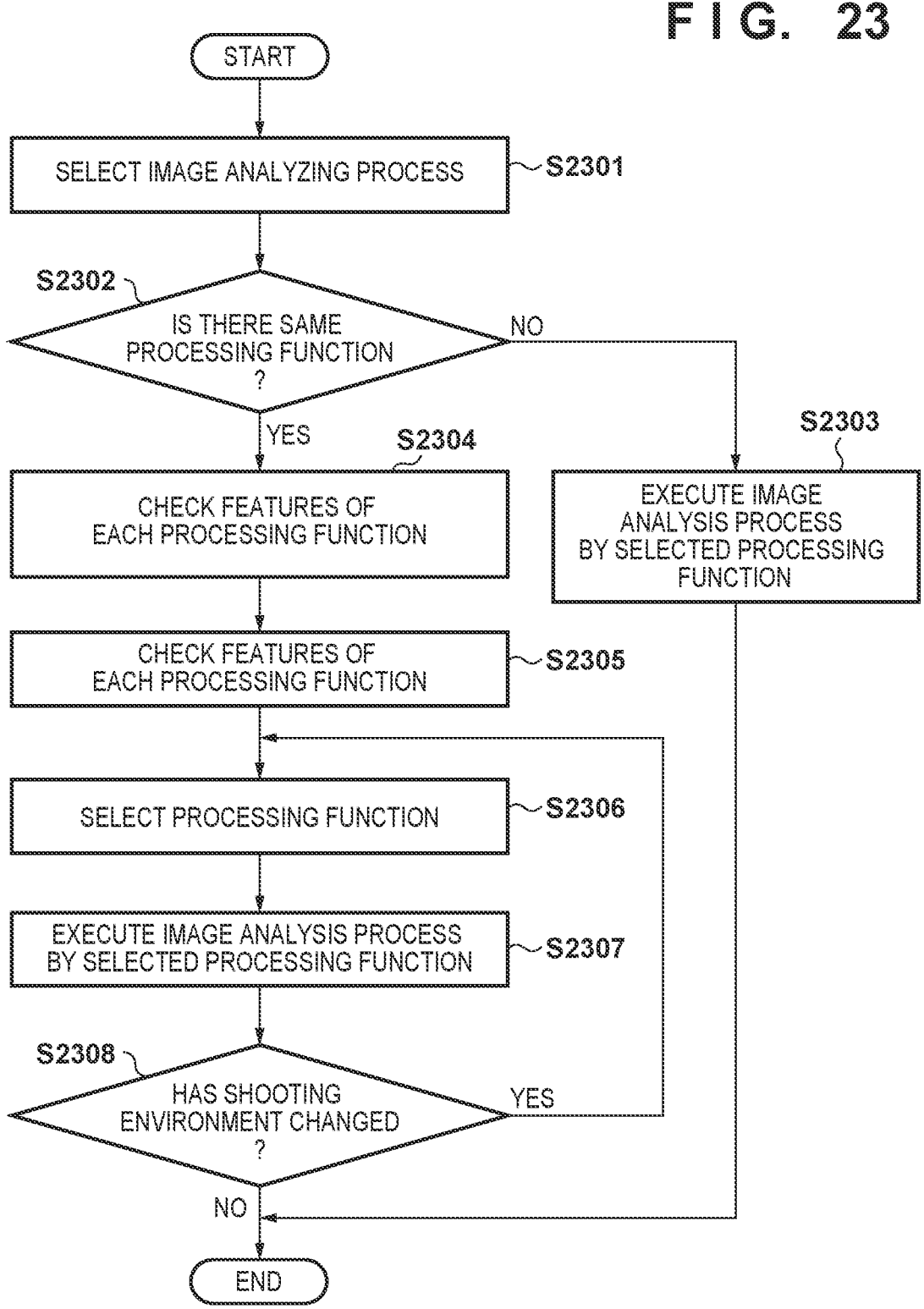
FIG. 23 is a flowchart illustrating a selecting process of processing functions according to the present embodiment.

In FIG. 23, a second processing example for appropriately selecting processing functions will be described. This processing is executed in order to select processing functions appropriate for the use when the auxiliary processing apparatus 100a has a plurality of processing functions that can execute the same process. Note that this processing is executed when it is determined that the auxiliary processing apparatus 100a is caused to execute some processes in the first processing example. That is, this processing is for determining which of executable one or more processing functions is used to execute processing, when the auxiliary processing apparatus 100a executes processing. This is merely an example, and the process sharing between the image capturing apparatus 110a and the auxiliary processing apparatus 100a may be determined with this processing example. For example, when the image capturing apparatus 110a and the auxiliary processing apparatus 100a have a plurality of processing functions that can execute the same process, in the integrated process list, this processing is applied. Here, this processing may be used in order to determine which of the processing functions will be used. That is, when the image capturing apparatus 110a and the auxiliary processing apparatus 100a each have one or more processing functions that can execute the same process, using which of the processing functions of the respective apparatuses processing is to be executed is determined with this processing.

In FIG. 22, the user selects an analyzing process through the information processing apparatus 130, similarly to step S2201 in FIG. 22. The control unit 304 of the image capturing apparatus 110a acquires information indicating the selected process from the information processing apparatus 130 (S2301). The control unit 304 determines the list of processes that the auxiliary processing apparatus 100a can execute (second process list). The control unit 304 determines, with respect to the analyzing process, whether or not the auxiliary processing apparatus 100a has a plurality of processing functions that can execute the same process (S2302). If it is determined that the number of processing functions that can execute the analyzing process is one (NO in step S2302), the control unit 304 advances the processing to step S2303. The control unit 304 executes the process using that processing function (S2303). On the other hand, if it is determined that a plurality of processing functions can executed the analyzing process (YES in step S2302), the control unit 304 advances the processing to step S2304. In the following, the method of determining using which of the plurality of processing functions processing is to be executed will be described.

In step S2304, the control unit 304 determines the features of the plurality of processing functions that can execute the same process that are determined in step S2302. Here, the feature determination is determination such as that, with respect to face feature extraction, the first processing function is suitable for processing on an image that is shot in a daytime and whose luminance is relatively high, for example. Similarly, the control unit determines the feature that the second processing function is suitable for processing on an image that is shot at night and whose luminance is relatively low, and the like. After determining the difference in feature between the processing functions, the control unit 304 determines under which environment the image capturing apparatus 110a is currently performing shooting (S2305). The control unit 304 selects the processing function to be used for the analyzing process based on the features of the processing functions that are acquired in step S2304 and the information regarding the shooting environment acquired in step S2305 (S2306). The control unit 304 executes the analyzing process using the selected processing function (S2307).

Here, the determination of the shooting environment may be performed based on an internal clock of the image capturing apparatus 110a and the distribution of luminance values of images shot by the image capturing apparatus 110a, for example. For example, if the internal clock indicates a night time slot, the control unit 304 selects a processing function suitable for processing of an image whose luminance value is relatively low. Also, if the luminance values of shot images are localized to lower values, the control unit 304 selects a processing function suitable for image processing of an image whose luminance value is relatively low. Also, the distribution of evaluation values regarding the detection accuracy with respect to the luminance value may be prepared for each processing function. For example, a configuration may be adopted in which a processing function is selected regarding which the sum of values is largest, the values being obtained by multiplying the frequency and the value indicating the detection accuracy at the respective luminance values of a shot image, for example. Also, the determination of shooting environment may also be performed based on information regarding the angle of view (panning, tilting, zooming) at the time of shooting performed by the image capturing apparatus 110a, for example.

For example, which of the processing functions will be used is determined according to whether a dark area in a room is being shot or a bright area near a window is being shot. Note that the feature of a processing function may also be defined by an index other than the luminance value. For example, various features such as face extraction accuracy being high in an image in which a predetermined object such as a window is included and detection accuracy of an object that is moving at a high speed being high may be used as a reference for selection of a processing function to be used. Also, for example, each processing function may have a feature such as that the processing speed is high but the accuracy is low, or a feature that the processing speed is relatively low but the accuracy is high, and a suitable processing function may be selected according to the processing conditions.

The control unit 304 determines whether or not the shooting environment has changed while performing processing (S2308). If it is determined that the shooting environment has changed (YES in step S2308), the control unit 304 advances the processing to step S2306. The control unit 304 again executes processing for selecting a processing function suitable for the shooting environment after change (S2306). The control unit 304 executes the analyzing process using the selected processing function (S2307). On the other hand, if it is determined that the shooting environment has not changed (NO in step S2308), the control unit 304 continues the analyzing process without changing the processing function, and ends the processing. According to this processing, it is possible to select and use a processing function suitable for the environment from a plurality of processing functions that can execute the same process. Accordingly, a suitable processing function can be selectively used for each shooting environment, from a viewpoint of processing accuracy and the like.

Figure 24:
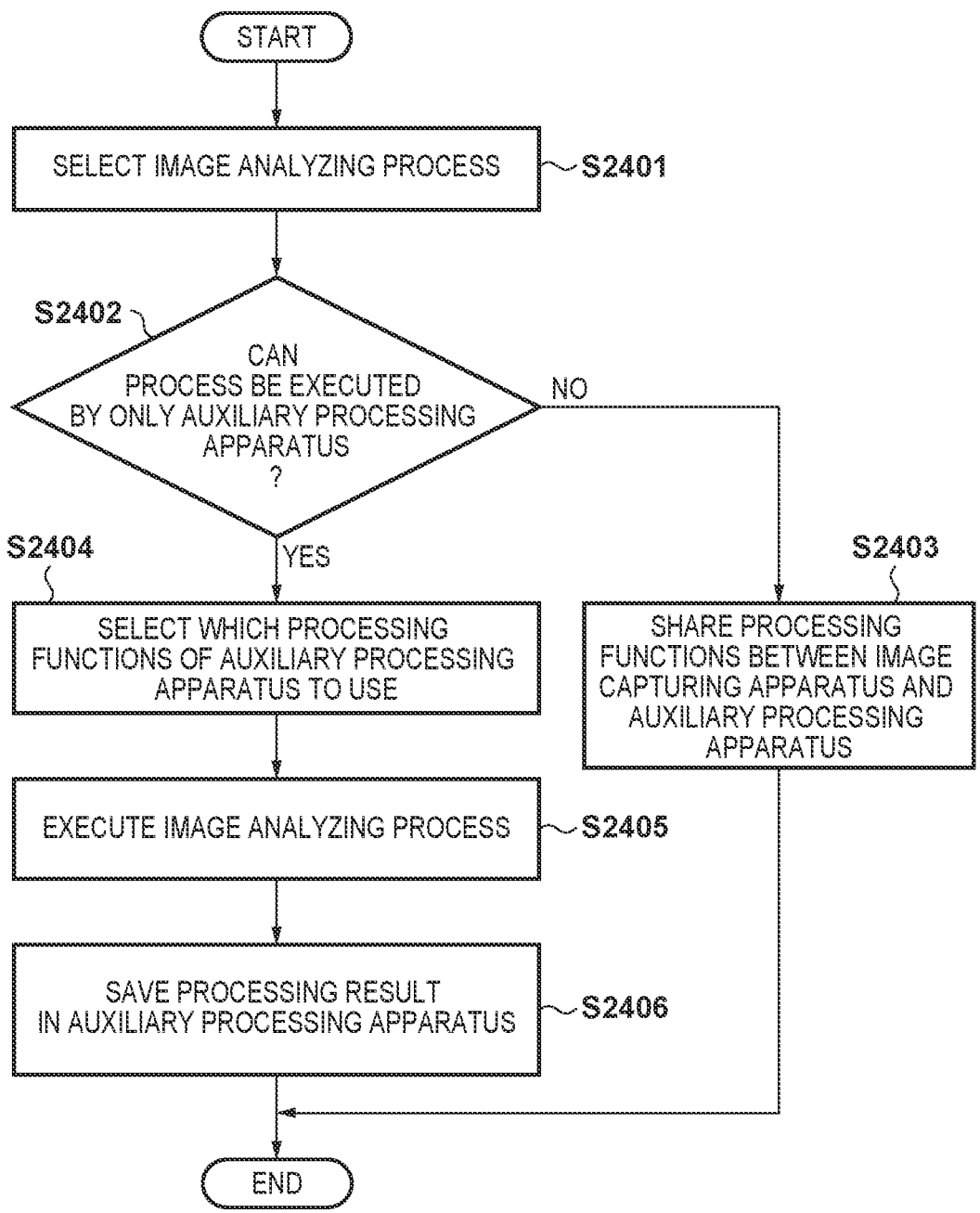
FIG. 24 is a flowchart illustrating a selecting process of processing functions according to the present embodiment.

FIG. 24 is for describing a third processing example for determining the process sharing between the image capturing apparatus 110a and the auxiliary processing apparatus 100a. In this processing, the process sharing is determined according to whether or not processing can be completed by only combining processing functions that the auxiliary processing apparatus 100 has.

In FIG. 24, the user selects an analyzing process through the information processing apparatus 130, similarly to step S2201 in FIG. 22 and step S2301 in FIG. 23. The control unit 304 of the image capturing apparatus 110a acquires information indicating the selected process from the information processing apparatus 130 (S2401). The control unit 304 determines whether or not the selected process can be executed by only the auxiliary processing apparatus 100a (S2402). Note that the control unit 304 determines whether or not all functions of the selected process can be satisfied by combining the processing functions that the auxiliary processing apparatus 100a has, for example. Also, the control unit 304 may perform determination in step S2402 based on whether or not the processing result may be saved to the auxiliary processing apparatus 100a or not. If it is determined that all functions of the selected process can be satisfied by combining the processing functions that the auxiliary processing apparatus 100a has, and the processing result is allowed to be saved to the auxiliary processing apparatus 100a, the control unit 304 determines that the processing can be performed by only the auxiliary processing apparatus 100.

If it is determined that the selected process cannot be executed only by the auxiliary processing apparatus 100a (NO in step S2402), the control unit 304 advances the processing to step S2403. The control unit 304 performs process sharing between the image capturing apparatus 110a and the auxiliary processing apparatus 100a (S2403). Here, similarly to the first processing example and the second processing example, the process sharing is determined. Note that the control unit 304 need not use the processing functions of the auxiliary processing apparatus 100a such that all the processing is executed by the image capturing apparatus 110a. On the other hand, if it is determined that the selected process can be executed only by the auxiliary processing apparatus 100a (YES in step S2402), the control unit 304 advances the processing to step S2404. The control unit 304 selects processing functions to be used from the processing functions that the auxiliary processing apparatus 100a has (S2404).

Note that when the auxiliary processing apparatus 100a has a plurality of processing functions that can execute the same process, any of the aforementioned processing functions is selected for use, similarly to the second processing example. Thereafter, the control unit 304 executes processing for causing the auxiliary processing apparatus 100a to execute the image analyzing process using the selected processing function (S2405). Also, the control unit 304 execute processing for saving the result of performing the image analyzing process in step S2405 to the auxiliary processing apparatus 100a (S2406), and ends the processing. These processes are executed using commands specified in the SD standard, for example. Note that, in step S2406, the image processing analysis result may be saved in the storing unit 404, and if the circuit 402 includes a RAM, the result may be save in the RAM.

In this processing, when processes can be executed by the auxiliary processing apparatus 100a, the auxiliary processing apparatus 100a is caused to execute the processes. Accordingly, the process to be executed by the image capturing apparatus 110a is only transmission of an image to the auxiliary processing apparatus 100a, and therefore the processing load of the image capturing apparatus 110a can be largely reduced. As described above, as a result of increasing the number of processing functions that can be executed by the image capturing apparatus 110a using the auxiliary processing apparatus 100a, the processing functions of the image capturing system 10 can be enhanced. For example, as a result of implementing a latest processing function in the auxiliary processing apparatus 100a, the image capturing apparatus 110a need not be replaced. Also, the image capturing apparatus 110a can execute the image analyzing process using the latest processing function. Accordingly, the image capturing system 10 can be flexibly operated, and therefore the user convenience can be improved.

Figure 25:
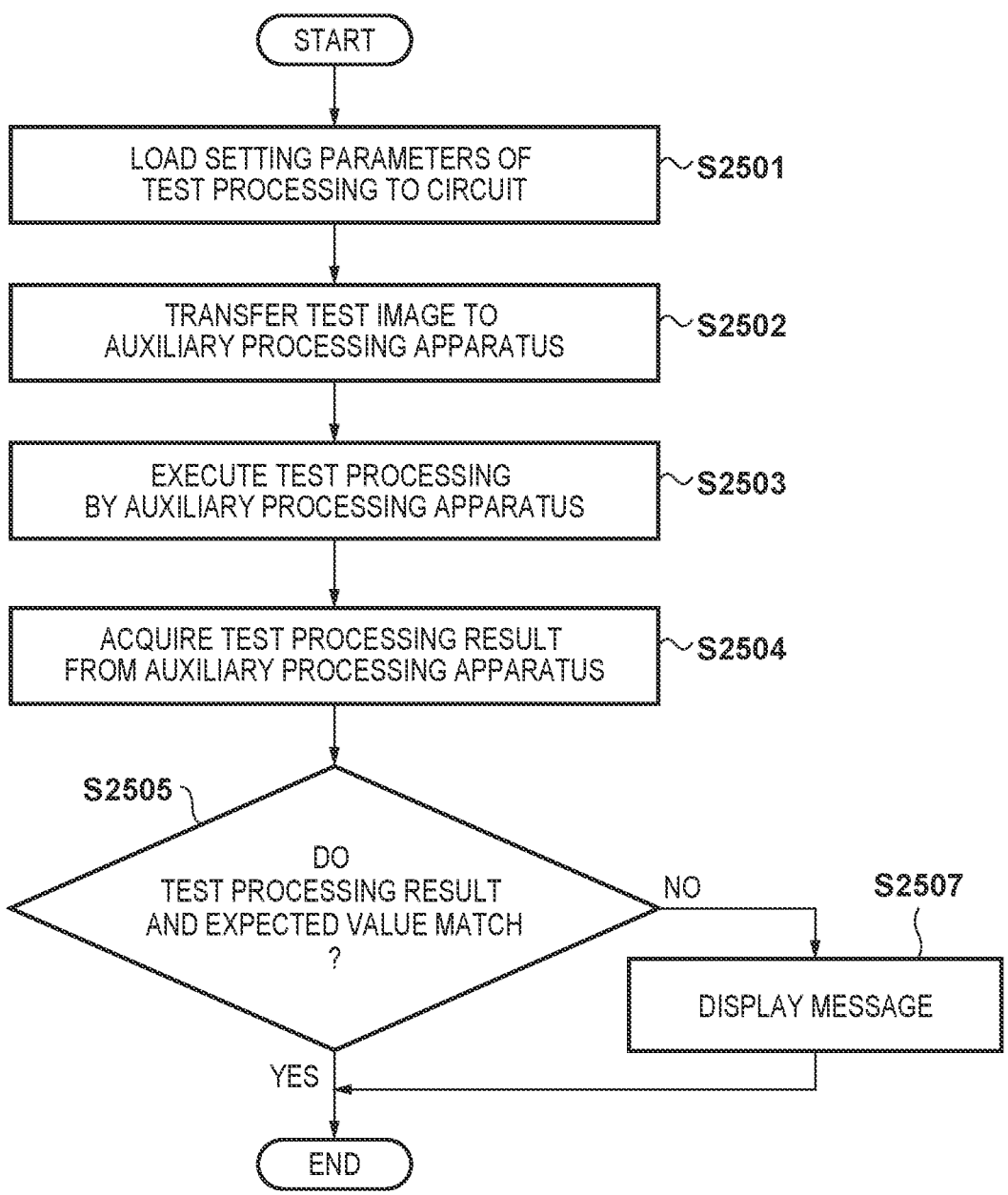
FIG. 25 is a flowchart of a fault diagnosis process according to the present embodiment.

FIG. 25 shows an example of a processing flow for the image capturing apparatus 110a to perform fault diagnosis on the auxiliary processing apparatus 100a. This processing is performed after the processing in step S802 in FIG. 8. The storing unit 303 stores setting parameters for execution in the processing unit 412 and a test image in order to perform fault diagnosis (test processing) on the circuit 402. The storing unit 303 further includes an expected value (signal information) that is an output value when the processing unit 412 executes the processing using the test image and the setting parameters. Here, the input to the test processing is a 128×128 RGB image and the output is a 1000 8-bit data strings. Furthermore, the test processing performs, one time each, a convolution operation and an ReLU operation that are used in deep learning. The test image is a gray image in which the RGB values are each 128 in 256 levels. In the expected value, 1000 8-bit data strings are all 0.5.

In FIG. 25, the image capturing apparatus 110a writes the setting parameters in the storing unit 303 to the storing unit 404 of the auxiliary processing apparatus 100a. The auxiliary processing apparatus 100a loads the setting parameters to the circuit 402 (S2501). The image capturing apparatus 110a may perform, as needed, re-configuration of the circuit 402 by transferring logic circuit data corresponding to the setting parameters to the circuit 402. The computation processing unit 203 of the image capturing apparatus 110a transfers the test image in the storing unit 303 to the storing unit 404 of the auxiliary processing apparatus 100a (S2502). After completing transferring of the test image, when the storing unit 404 of the auxiliary processing apparatus 100a stores the test image, the processing unit 412 of the circuit 402 executes the test processing on the test image using the setting parameters (S2503). After the test processing, the image capturing apparatus 110a acquires a test processing result from the auxiliary processing apparatus 100a (S2504). The test processing result may also be referred to as signal information.

Figure 26:
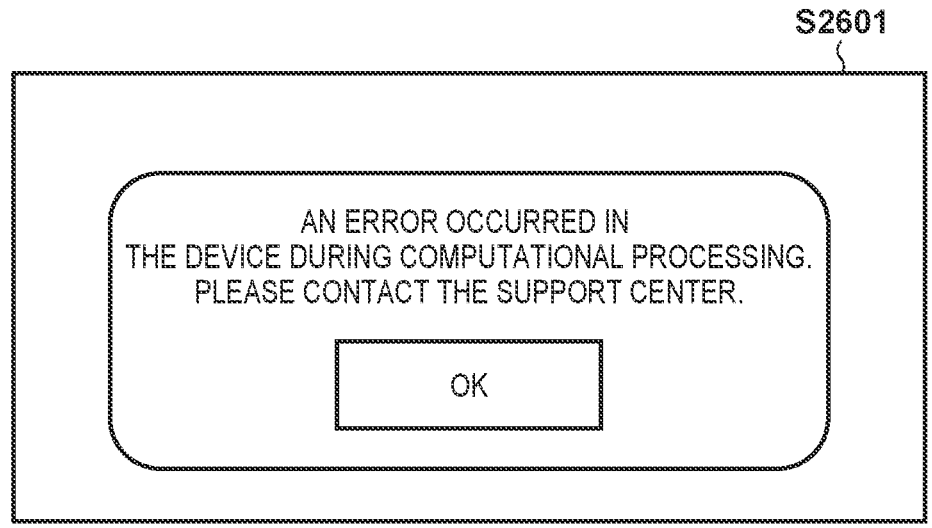
FIG. 26 is a diagram in which a fault diagnosis result is displayed in a user interface, according to the present embodiment.

The computation processing unit 203 of the image capturing apparatus 110a compares the test processing result with the expected value corresponding to the test image in the storing unit 303. The computation processing unit 203 ends the processing, if the comparison result indicates complete matching, and advances the processing to step S2507, if not (S2505). Here, the computation processing unit 203 determines whether the test processing result matches the expected value with respect to all of the 1000 values included therein. That is, the computation processing unit 203 determines whether or not the 1000 values in the test processing result are all 0.5. If it is determines that the comparison result does not satisfy the condition (No in step S2505), the computation processing unit 203 advances the processing to step S2507. The computation processing unit 203 determines that the auxiliary processing apparatus 100a is failed (anomalous), and displays a message dialog in the display unit 703 (S2507). Here, it is determined whether at least one of the processing unit 412 and the storing unit 404 that are included in the auxiliary processing apparatus 100a is anomalous (failed). An exemplary display of the message dialog is shown in FIG. 26. In FIG. 26, a screen S2601 displays a message saying that "An error occurred in the device during computational processing. Please contact the support center.". A configuration may be adopted in which when an OK button in FIG. 26 is pressed by a user, the screen S2601 is erased.

Note that the test processing is not limited to that in which a test image is used, and any configuration may be adopted as long as the output changes according to the input. Also, the test processing may be processing for performing computational operation according to the circuit implemented in the circuit 402. For example, when Pooling operations that are used in deep learning are executed, a Pooling operation circuit may be implemented in the circuit 402. Furthermore, there are cases where the computation amount of the computation processing unit 203 is large, and the storing unit 404 is used as a saving area of temporary data during computation. The test processing may be a small scale processing in which the storing unit 404 is not used. Accordingly, which of the processing unit 412 and the storing unit 404 of the circuit 402 is failed can be accurately determined.

The test image may be generated by the image capturing apparatus 110a. For example, the configuration may be such that an image whose RGB values are all 128 is generated by calculation, and the image is transferred to the auxiliary processing apparatus 100a. The setting parameters, the test image, and the expected value are saved at any locations. For example, the setting parameters and the expected value may be stored in advance in the storing unit 404 of the auxiliary processing apparatus 100a, and may be transferred to the image capturing apparatus 110 along with the test processing result. The message dialog that is displayed when the comparison result indicates difference may be in any format as long as a user is notified of a failure. Furthermore, the message dialog may also be a message for notifying the user of the fact that the auxiliary processing apparatus 100a is normal, when the comparison result indicates matching. Also, the notification may be in a mode in which a message is output to a console, an event is notified to another server connected to the image capturing apparatus 110a, or a message is displayed to a client apparatus connected to a server.

Figure 27:
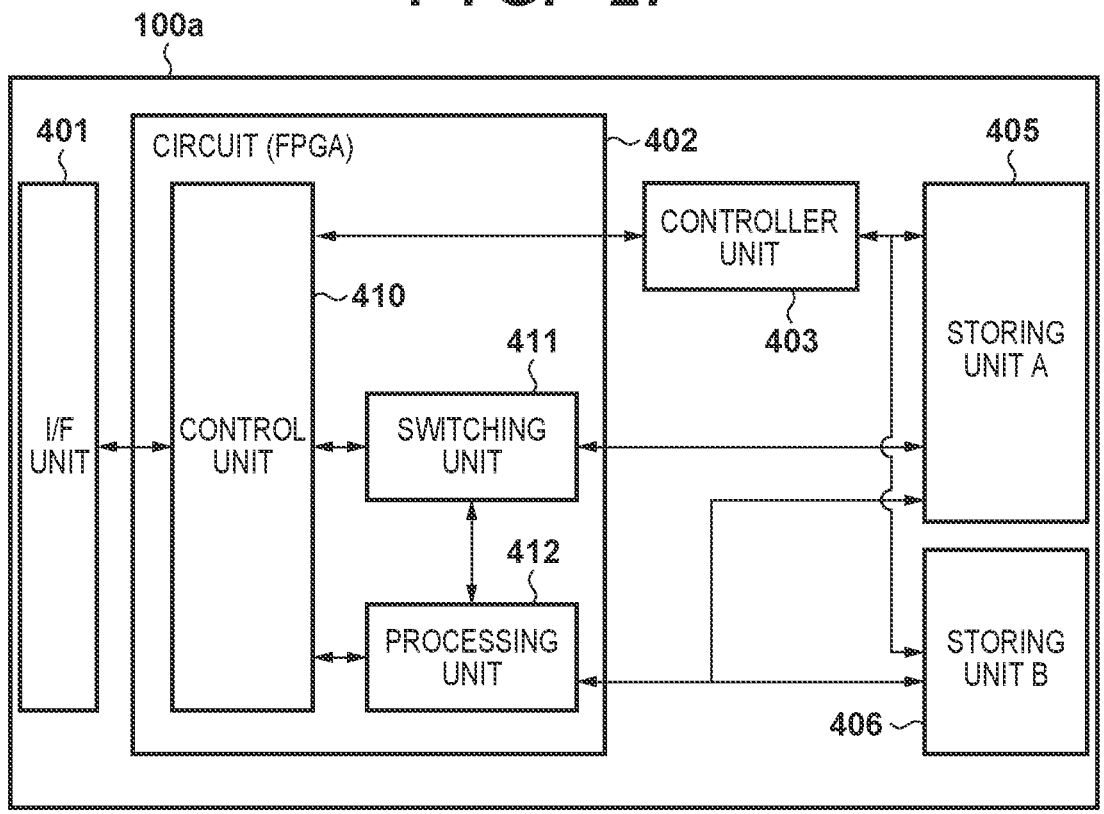
FIG. 27 is a configuration diagram of an auxiliary processing apparatus according to the present embodiment.

Next, an example of a case where two types of storing units are mounted in the auxiliary processing apparatus 100a will be described. Although this processing is performed by the user at any timing after step S804 in FIG. 8, here, an example in which the processing is performed after the processing in step S806 will be described. FIG. 27 shows an exemplary hardware configuration of the auxiliary processing apparatus 100a. The constituent elements similar to those in FIG. 4 will not be described. The auxiliary processing apparatus 100a includes a storing unit A405 and a storing unit B406, in place of the storing unit 404 in FIG. 4. The storing unit A405 is a nonvolatile memory (ROM) that can retain information even if the power supply is turned off, and stores setting parameters used in processing performed by the processing unit 412 of the circuit 402. The storing unit B406 is a volatile memory (RAM) in which information is erased when power is no longer supplied, and stores input data needed for the processing performed by the processing unit 412.

The setting parameters in the test processing are the same as the setting parameters used in the image analyzing process. Here, specifically, a case where face detection is performed as the image analyzing process will be described. Here, similarly to the first embodiment, the input is a 128×128 RGB image, and the output is 1000 8-bit data strings. The test image is a gray image in which the RGB values are each 128 in 256 levels, and in the expected value, 1000 8-bit data strings are all 0.5. The setting parameters to be used in the image analyzing process are stored in the storing unit A405 and the storing unit 303 of the image capturing apparatus 110a, and the test image and the expected value is stored in the storing unit 303. Also, the storing unit 303 retains a re-installed flag indicating that the setting parameters to be used in the image analyzing process are re-installed in the storing unit A405. The storing unit 303 retains a rebooted flag indicating that the auxiliary processing apparatus 100a is rebooted in the test processing. All of the aforementioned flags are in an OFF state before performing the test processing.

Figure 28A:
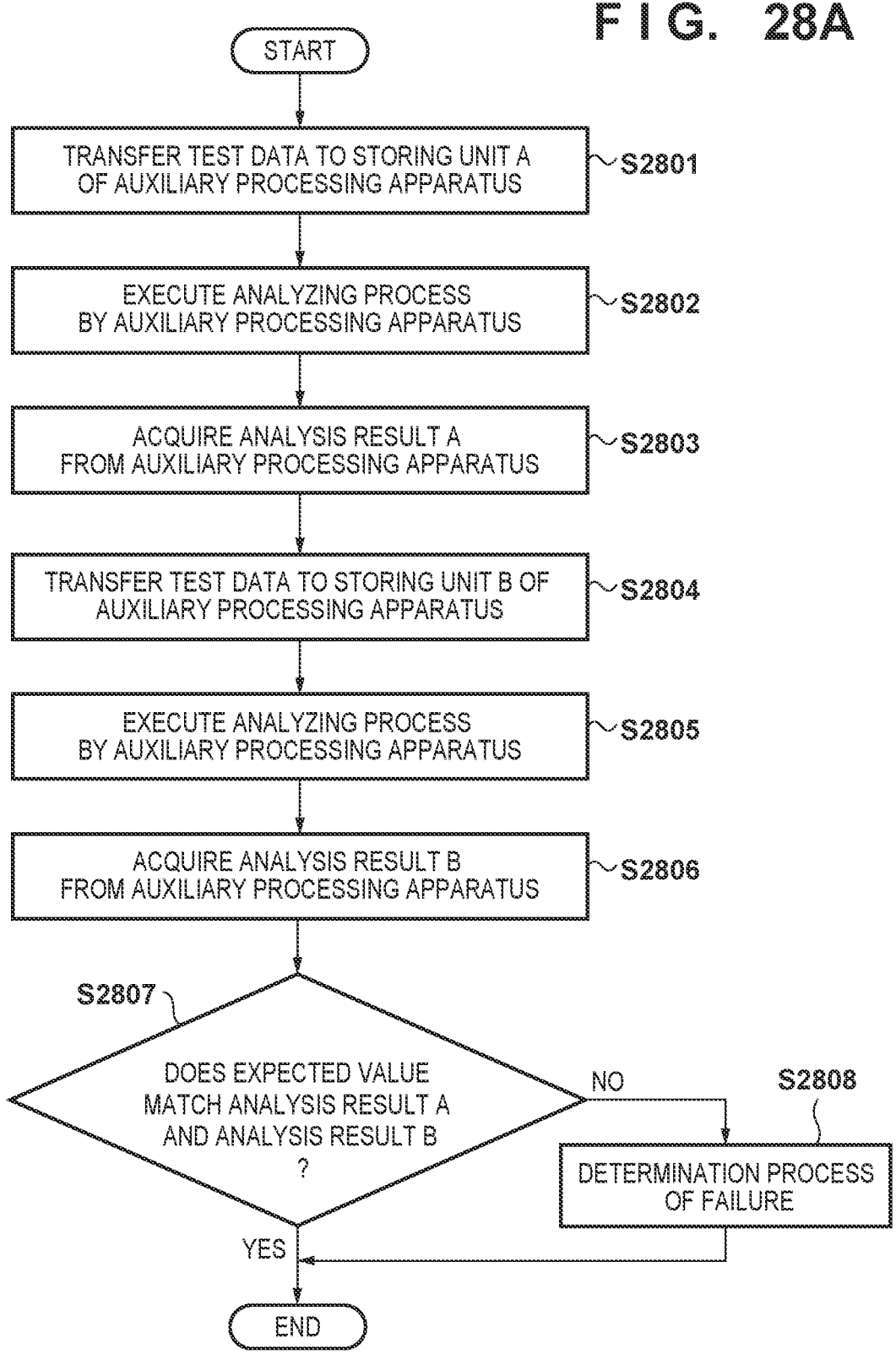
FIG. 28A is a flowchart of a fault diagnosis process according to the present embodiment.

FIG. 28A shows an example of the determination process of failure of the auxiliary processing apparatus 100a. In FIG. 28A, the computation processing unit 203 of the image capturing apparatus 110a transfers the test image in the storing unit 303 to the storing unit A405 (S2801). After completing transferring of the test image, the auxiliary processing apparatus 100a causes the circuit 402 (processing unit 412) to execute the analyzing process on the test image in the storing unit A405 using the setting parameters for the image analyzing process (S2802). After the analyzing process performed by the circuit 402 (processing unit 412), the image capturing apparatus 110a acquires an analysis result A (signal information) from the auxiliary processing apparatus 100a (S2803). Next, the computation processing unit 203 transfers the test image in the storing unit 303 to the storing unit B406 (S2804). After completing transferring of the test image, the auxiliary processing apparatus 100a causes the circuit 402 (processing unit 412) to execute the analyzing process on the test image in the storing unit B406 using the setting parameters for the image analyzing process (S2805). After the analyzing process performed by the circuit 402 (processing unit 412), the image capturing apparatus 110a acquires an analysis result B (signal information) from the auxiliary processing apparatus 100a (S2806).

The computation processing unit 203 performs comparison between the analysis result A, the analysis result B, and the expected value in the storing unit 303. If the computation processing unit 203 determines that the analysis result A completely matches the expected value, and the analysis result B completely matches the expected value (Yes in S2807), the processing is ended. If the computation processing unit 203 determines that the analysis result A does not match the expected value, or the analysis result B does not match the expected value, or the analysis result A and the analysis result B do not match the expected value, (No in S2807), the processing is advanced to step S2808. Here, the computation processing unit 203 determines whether or not all of the values of 1000 8-bit data strings that are output of each of the analysis result A and the analysis result B completely matches those of the expected value. That is, the computation processing unit 203 determines whether or not 1000 values of each of the analysis result A and the analysis result B are all 0.5. Here, it is determined that at least one of the processing unit 412, storing unit A405, and the storing unit B406 that are included in the auxiliary processing apparatus 100a is anomalous (failed). The computation processing unit 203 performs detailed failure determination process based on the determination result (S2808).

Figure 28B:
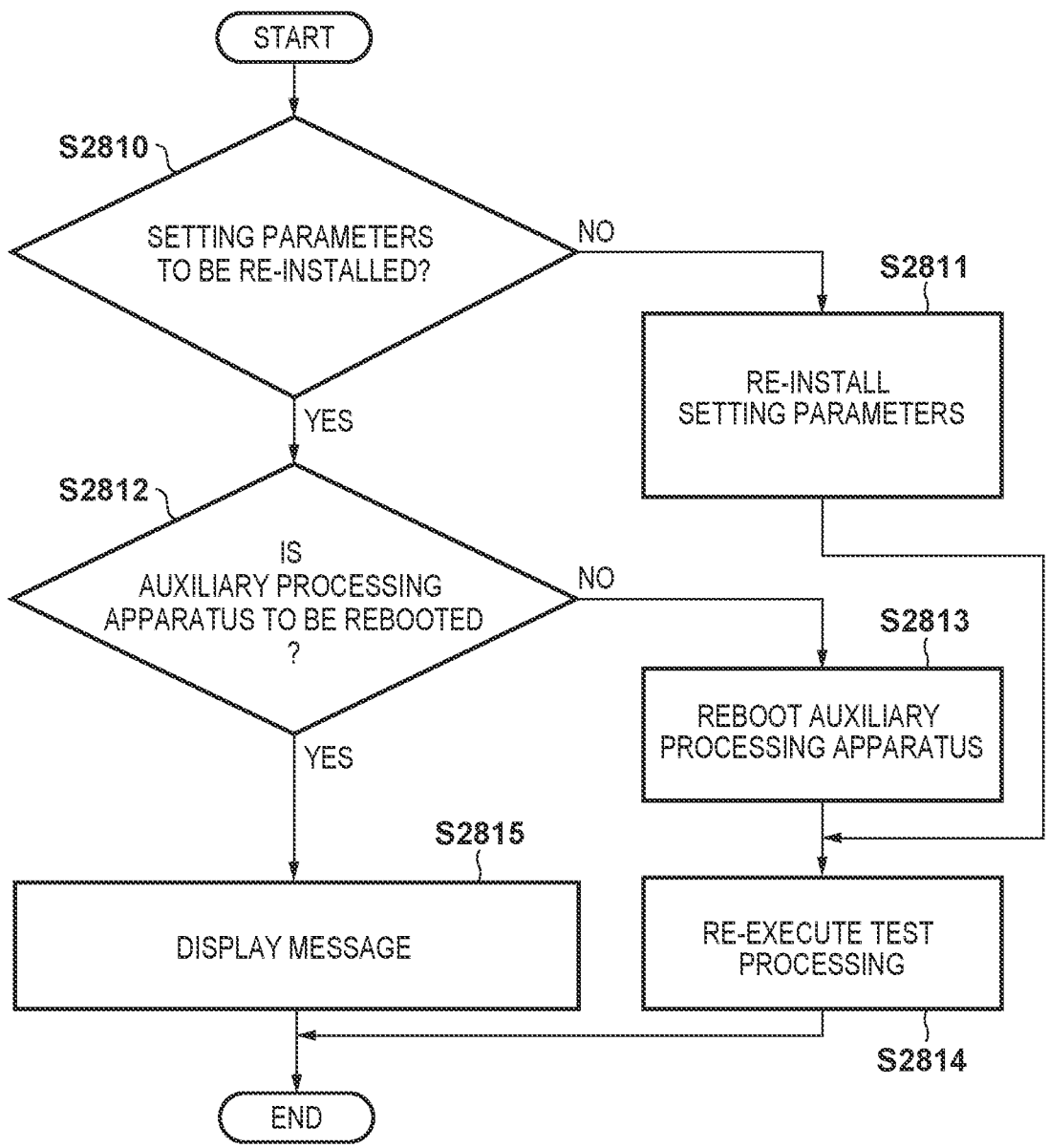
FIG. 28B is a flowchart of a fault diagnosis process according to the present embodiment.

Next, the detailed failure determination process will be described. The correspondence relationship between the comparison results between the analysis results (A, B) and the expected value and the failure, in this embodiment, will be described. In the present embodiment, the failure of the storing unit B406 and the failure of the processing unit 412 are determined. Note that the storing unit A405 is in a normal state at the point in time at which this sequence is executed after the processing in step S802 has been normally ended as the initial sequence. FIG. 28B shows an example of a detailed failure determination process of the auxiliary processing apparatus 100a.

In FIG. 28B, the computation processing unit 203 determines whether or not the analysis result A does not match the expected value or the analysis result B does not match the expected value, or the analysis result A and the analysis result B do not match the expected value. Furthermore, the computation processing unit 203 determines whether or not the display result of the re-installed flag indicates OFF (S2810). That is, the computation processing unit 203 determines whether or not both of the two conditions are satisfied, and if the two conditions are satisfied, the processing is advanced to step S2811. If the analysis result A does not match the expected value, and the analysis result B does not match the expected value, and the re-installed flag is OFF (No in step S2810), the computation processing unit 203 determines that the processing unit 412 is anomalous. If the aforementioned condition in S2810 is not satisfied (Yes in step S2810), the processing is advanced to step S2812.

The computation processing unit 203 re-installs the setting parameters for the image analyzing process in the storing unit 303 to the storing unit A405, and changes the re-installed flag to ON (S2811). Here, a message dialog saying that "Setting parameters are re-installed to the device" is displayed in the display unit 703. Thereafter, the test processing in step S2801 and onward is restarted (S2814), and the processing is ended. Returning to step S2812, the computation processing unit 203 determines whether the analysis result A matches the expected value and the analysis result B does not match the expected value, and determines whether the rebooted flag is OFF (S2812). If the analysis result A matches the expected value, the analysis result B does not match the expected value, and the rebooted flag is OFF (No in step S2812), computation processing unit 203 determines that the storing unit B406 is anomalous. Furthermore, the computation processing unit 203 determines that the auxiliary processing apparatus 100a will be rebooted, and the processing is advanced to step S2813. If the computation processing unit 203 determines that the condition in step S2812 is not satisfied, that is, the analysis result A does not match the expected value, the analysis result B match the expected value, and the rebooted flag is ON (Yes in step S2812), the processing is advanced to step S2815.

In step S2813, the computation processing unit 203 changes the rebooted flag to ON, and one minutes after, the auxiliary processing apparatus 100a is rebooted (S2813). Here, a message dialog saying that "Rebooting is performed one minute after" is displayed in the display unit 703. Thereafter, the test processing in step S2801 and onward is again executed (S2814), and the processing is ended. If it is determined that the processing unit 412 is anomalous, and the re-installed flag is ON, the computation processing unit 203 determines that the processing unit 412 is failed (anomalous). Alternatively, if it is determined that the storing unit B406 is anomalous, and the rebooted flag is ON, the computation processing unit 203 determines that the storing unit B406 is failed. The computation processing unit 203 displays the failed unit in a message dialog in the display unit 703 (S2815). For example, after a message saying that "In the device, an error has occurred during computational processing. Please contact the support center.", the following message is displayed. The display unit 703 displays a message saying that "Computation processing unit is anomalous" or "Memory is anomalous", for example.

In step S2811, when the setting parameters are re-installed, logic circuit data corresponding to the setting parameters is transferred to the circuit 402, as needed, and the re-configuration thereof may be performed. Also, only a message for prompting re-installation of the setting parameters is displayed, and the user may be caused to re-install the setting parameters. Although the rebooted flag indicating whether or not rebooting is performed is used in the determination conditions in step S2812, a counter for counting the number of times of rebooting may be used, in place of the rebooted flag. For example, the configuration may be such that rebooting of the processing unit 412 is performed until the number of times of rebooting reaches a threshold value, and when the number of times exceeds the threshold value, it is determined that the storing unit B406 is failed. The wait time until the rebooting of the auxiliary processing apparatus 100a is performed in step S2813 may be changed according to the state of the auxiliary processing apparatus 100a. For example, the configuration may be such that, if the temperature of the auxiliary processing apparatus 100a is lower than a threshold value, rebooting is performed. Also, the user may be caused to perform rebooting of the auxiliary processing apparatus 100a by only displaying a message for prompting rebooting.

An example in which the analyzing process is an image analyzing process has been described in the embodiments described above, but the present invention can also be applied to a sound analyzing process. Specifically, it can be applied to processing for detecting sound patters such as a scream, a sound of gunfire, and a sound emitted when glass is broken. For example, sound feature amounts are extracted using various sound data analysis methods such as spectral analysis, and the detected sound pattern is compared with the sound feature amounts. A specific sound pattern can be detected based on the matching degrees between the feature amounts and the detected sound pattern. Also, when a sound analyzing process is performed, sound data is divided into pieces of sound data of a predetermined time period, and the sound analyzing process is performed in units of sound data of the predetermined time period. Also, this predetermined time period is changed according to the sound pattern to be detected. Therefore, sound data for every time period corresponding to the sound pattern to be detected is input to the auxiliary processing apparatus 100a. The auxiliary processing apparatus 100a include means for analyzing the input sound data, and means for retaining the input sound data.

Also, in the embodiments described above, the auxiliary processing apparatus 100a that can store data input from the image capturing apparatus 110a in a non-transitory manner has been described as an example. However, an auxiliary processing apparatus 100a that cannot store data input from the image capturing apparatus 110a in a non-transitory manner may be used in some embodiments. That is, the auxiliary processing apparatus 100a only performs an analyzing process on data input from the image capturing apparatus 110a, and need not store the data in a non-transitory manner. That is, an auxiliary processing apparatus 100a having a function specialized in the analyzing process may also be employed, instead of an apparatus having a data retaining function such as a normal SD card.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-039533, filed Mar. 11, 2021, which is hereby incorporated by reference herein in its entirety.

What is claimed is:

1. An image capturing apparatus including a mounting part capable of attaching/detaching a device, comprising:
   one or more processors; and
   one or more memories storing one or more programs configured to be executed by the one or more processors, the one or more programs including instructions for:
   storing, in the one or more memories, first signal information that is obtained by processing a captured first image;
   sending the first image to the device mounted in the mounting part;
   receiving second signal information obtained by a processor of the device processing the first image stored in a memory of the device;
   receiving third signal information obtained by the processor of the device processing the first image stored in another memory of the device; and
   determining whether or not one of the processor of the device and another memories of the device is anomalous based on whether or not the first signal information matches the second signal information and whether or not the first signal information matches the third signal information,
   wherein the one or more memories have a first flag indicating whether or not a parameter for processing the first image is re-installed to the memory of the device and a second flag indicating whether or not the processor of the device is rebooted,
   whether or not the processor of the device is anomalous and whether or not another memory of the device is anomalous are determined based on the first flag and the second flag.

2. The image capturing apparatus according to claim 1, wherein the processor of the device and the memories of the device are determined not to be anomalous in a case where the first signal information matches the second signal information.

3. The image capturing apparatus according to claim 1, wherein the one or more programs further include instructions for:
   notifying a user of whether or not the device is anomalous.

4. The image capturing apparatus according to claim 1, wherein the one or more memories and the memory of the device store, in advance, parameters for the device to process the first image.

5. The image capturing apparatus according to claim 4, wherein, in a case where the device is anomalous, the parameter stored in the one or more memories is re-installed to the memory of the device.

6. The image capturing apparatus according to claim 1, wherein the processor of the device is determined to be anomalous in a case where the first signal information does not match the second signal information and the first signal information does not match the third signal information.

7. The image capturing apparatus according to claim 1, wherein another memory of the device is determined to be anomalous in a case where the first signal information matches the second signal information and the first signal information does not match the third signal information.

8. The image capturing apparatus according to claim 1, wherein, in a case where the first signal information does not match the second signal information and the first signal information does not match the third signal information, and in a case where the first flag indicates that the parameter is re-installed to the memory of the device, the processor of the device is determined to be anomalous.

9. The image capturing apparatus according to claim 1, wherein, in a case where the first signal information matches the second signal information and the first signal information does not match the third signal information, and in a case where the second flag indicates that the processor of the device is rebooted, another memory of the device is determined to be anomalous.

10. The image capturing apparatus according to claim 1, wherein the memory of the device is a volatile memory and another memory of the device is a nonvolatile memory.

11. The image capturing apparatus according to claim 1, wherein the device is a SD card.

12. A control method of an image capturing apparatus including a mounting part capable of attaching/detaching a device, the control method comprising:
   storing, in the one or more memories, first signal information that is obtained by processing a captured first image;
   sending the first image to the device mounted in the mounting part;
   receiving second signal information obtained by a processor of the device processing the first image stored in a memory of the device;
   receiving third signal information obtained by the processor of the device processing the first image stored in another memory of the device; and
   determining whether or not one of the processor of the device and another memories of the device is anomalous based on whether or not the first signal information matches the second signal information and whether or not the first signal information matches the third signal information,
   wherein the one or more memories have a first flag indicating whether or not a parameter for processing the first image is re-installed to the memory of the device and a second flag indicating whether or not the processor of the device is rebooted,
   whether or not the processor of the device is anomalous and whether or not another memory of the device is anomalous are determined based on the first flag and the second flag.

13. A non-transitory computer-readable storage medium storing a program that, when executed by a computer, causes the computer to perform a control method of an image capturing apparatus including a mounting part capable of attaching/detaching a device, the control method comprising:
   storing, in the one or more memories, first signal information that is obtained by processing a captured first image;
   sending the first image to the device mounted in the mounting part;
   receiving second signal information obtained by a processor of the device processing the first image stored in a memory of the device; and
   receiving third signal information obtained by the processor of the device processing the first image stored in another memory of the device;
   determining whether or not one of the processor of the device and another memories of the device is anomalous based on whether or not the first signal information matches the second signal information and whether or not the first signal information matches the third signal information,
   wherein the one or more memories have a first flag indicating whether or not a parameter for processing the first image is re-installed to the memory of the device and a second flag indicating whether or not the processor of the device is rebooted;
   whether or not the processor of the device is anomalous and whether or not another memory of the device is anomalous are determined based on the first flag and the second flag.

* * * * *